(12) United States Patent
Feola

(10) Patent No.: US 10,301,159 B2
(45) Date of Patent: May 28, 2019

(54) BEVERAGE DISPENSING MACHINE

(71) Applicant: Anthony V. Feola, Medford, MA (US)

(72) Inventor: Anthony V. Feola, Medford, MA (US)

( * ) Notice: Subject to any disclaimer, the term of this patent is extended or adjusted under 35 U.S.C. 154(b) by 0 days.

(21) Appl. No.: 15/721,174

(22) Filed: Sep. 29, 2017

(65) Prior Publication Data
US 2018/0022593 A1 Jan. 25, 2018

Related U.S. Application Data

(63) Continuation-in-part of application No. 14/912,431, filed as application No. PCT/US2014/052979 on Aug. 27, 2014, now Pat. No. 9,930,903.

(Continued)

(51) Int. Cl.
*B67D 1/00* (2006.01)
*B67D 1/08* (2006.01)
(Continued)

(52) U.S. Cl.
CPC ........... *B67D 1/0021* (2013.01); *A23G 9/045* (2013.01); *A23G 9/28* (2013.01); *A47J 31/41* (2013.01); *A47J 31/46* (2013.01); *B67D 1/0004* (2013.01); *B67D 1/0078* (2013.01); *B67D 1/0081* (2013.01); *B67D 1/07* (2013.01);
(Continued)

(58) Field of Classification Search
CPC .. B67D 1/0021; B67D 1/0004; B67D 1/0078; B67D 1/0081; B67D 1/07; B67D 1/0877; B67D 1/0888; A23G 9/28; A23G 9/045; A47J 31/41; A47J 31/46; G07F 9/023; G06Q 20/18; G06Q 20/327; G06Q 20/34
See application file for complete search history.

(56) References Cited

U.S. PATENT DOCUMENTS

| 3,796,349 | A | | 3/1974 | Weber | |
|---|---|---|---|---|---|
| 4,433,795 | A | * | 2/1984 | Maiefski | B67D 7/303 222/14 |

(Continued)

FOREIGN PATENT DOCUMENTS

WO    WO 2015/031515    3/2015

OTHER PUBLICATIONS

International Search Report in International Application No. PCT/US14/52979, dated Feb. 9, 2015.

(Continued)

*Primary Examiner* — Frederick C Nicolas
(74) *Attorney, Agent, or Firm* — Morse, Barnes-Brown & Pendleton, P.C.; Sean D. Detweiler, Esq.

(57) ABSTRACT

The present disclosure relates to a liquid beverage dispensing apparatus and specifically a modular component for installation on and use in conjunction with the liquid beverage dispensing system. The modular component includes a communication interface and controller, an actuator for a valve, for use with a beverage faucet that dispenses the liquid beverage. The actuator is in electronic communication with the communication interface and controller and is responsive to direction received from the communication interface and controller to open or close the valve. The modular component is sized, dimensioned, and configured to be retrofitted to an existing beverage dispensing system to replace an existing conventional manual beverage faucet, or as a newly manufactured system.

23 Claims, 23 Drawing Sheets

Related U.S. Application Data

(60) Provisional application No. 61/991,849, filed on May 12, 2014, provisional application No. 61/870,466, filed on Aug. 27, 2013, provisional application No. 62/405,636, filed on Oct. 7, 2016, provisional application No. 62/440,301, filed on Dec. 29, 2016.

(51) Int. Cl.
- *G07F 9/02* (2006.01)
- *A47J 31/41* (2006.01)
- *A47J 31/46* (2006.01)
- *B67D 1/07* (2006.01)
- *A23G 9/04* (2006.01)
- *A23G 9/28* (2006.01)
- *G06Q 20/32* (2012.01)
- *G06Q 20/18* (2012.01)
- *G06Q 20/34* (2012.01)

(52) U.S. Cl.
CPC ......... *B67D 1/0877* (2013.01); *B67D 1/0888* (2013.01); *G07F 9/023* (2013.01); *G06Q 20/18* (2013.01); *G06Q 20/327* (2013.01); *G06Q 20/34* (2013.01)

(56) References Cited

U.S. PATENT DOCUMENTS

| | | | |
|---|---|---|---|
| 5,091,713 A | 2/1992 | Horne | |
| 5,400,614 A | 3/1995 | Feola | |
| 5,799,832 A * | 9/1998 | Mayo | A23G 9/281 222/135 |
| 6,325,244 B2 * | 12/2001 | Vincent | A23G 9/228 222/1 |
| 6,325,250 B1 | 12/2001 | Feola | |
| 7,810,676 B2 * | 10/2010 | Romanyszyn | B67D 1/0021 222/129.1 |
| 7,913,879 B2 * | 3/2011 | Carpenter | B67D 1/0085 222/1 |
| 8,335,587 B2 | 12/2012 | Feola | |
| 9,930,903 B2 * | 4/2018 | Feola | A23G 9/28 |
| 2007/0114244 A1 * | 5/2007 | Gatipon | B67D 1/0022 222/129.1 |
| 2007/0232081 A1 | 10/2007 | Kil | |
| 2007/0272317 A1 * | 11/2007 | Klopfenstein | B67D 1/0031 137/889 |
| 2009/0105875 A1 | 4/2009 | Wiles | |
| 2010/0133360 A1 | 6/2010 | Gaetano | |
| 2011/0108569 A1 | 5/2011 | Jones | |
| 2013/0064943 A1 | 3/2013 | Feloa | |
| 2016/0198736 A1 | 7/2016 | Feola | |

OTHER PUBLICATIONS

Notice of Allowance and Fee(s) Due in U.S. Appl. No. 14/912,431, dated Nov. 30, 2017.

Office Action from U.S. Appl. No. 15/910,539 dated Nov. 1, 2018.

\* cited by examiner n-jectibles

| SYSTEM RUNNING | MULTI STATE INDICATOR | CLEAN CYCLE |
| --- | --- | --- |
| STOP | PRODUCT READY | PUSH TO STOP |
| | | PURGE NOZZLE |
| | | CLOSE |

| | HG OUTPUT | 0 |
| --- | --- | --- |
| | MTR AMPS | 0.00 |

| COMPRESSOR | ON |
| --- | --- |
| BEATER | ON |
| MIX PUMP | ON |

| STANDBY ACTIVE | SELECTION 1 | SELECTION 2 | START UP SCREEN | BEATER SETUP | OPERATIONS | SETUP SCREEN |

FIG. 9

BEVERAGE DISPENSING MACHINE

CROSS-REFERENCE TO RELATED APPLICATION(S)

This application is a continuation-in-part of U.S. application Ser. No. 14/912,431, filed Feb. 17, 2016, which was a national stage entry and claimed the benefit of International PCT Application No. PCT/US14/52979, filed Aug. 27, 2014, and also claimed priority to U.S. provisional patent application Ser. No. 61/991,849 filed on May 12, 2014 and U.S. provisional patent application Ser. No. 61/870,466 filed on Aug. 27, 2013, the disclosures of all of the aforementioned being hereby expressly and entirely incorporated herein by reference. This application also claims priority to U.S. provisional patent application Ser. No. 62/405,636, filed Oct. 7, 2016, and to U.S. provisional patent application Ser. No. 62/440,301, filed Dec. 29, 2016. The disclosures of said provisional applications are being hereby expressly and entirely incorporated herein by reference.

FIELD OF THE INVENTION

The present disclosure relates to food processing machines and methods, and more particularly to a machine for preparing and dispensing edible frozen product, or liquid beverage product, and a method for operating the same.

BACKGROUND

Liquid beverage dispensing systems, such as coffee dispensing and beer dispensing systems, have largely been fundamentally unchanged for decades. In terms of coffee dispensing systems, they typically involve use of a heated tank or container with a manual valve located in a bottom portion of the container. When coffee is desired, an operator manually controls the valve to dispense the coffee into a cup or other container. In terms of beer dispensing systems, the beer is typically contained in a keg or other pressurized container, with a hose or pipe connecting the keg to a beer faucet or tap. When beer is desired, an operator manually controls the beer faucet or tap to dispense the beer into a cup or other container.

Such existing machines have an inability to accurately dispense a predetermined desired amount of liquid beverage. Further, existing machines do not provide usage and production detail that would be helpful in inventory controls, determination of shrinkage, and cost or royalty accounting.

SUMMARY

There is a need for a modular component configured for use in a liquid beverage dispensing system that automates and provides better controls over the dispensing of liquid beverages, and also that more effectively measures output of dispensed beverages. The present invention is directed toward further solutions to address this need, in addition to having other desirable characteristics. Specifically, a modular component configured for use in a beverage dispensing system is provided. The modular component includes a communication interface and controller. A beverage faucet includes an actuator and a valve. The valve is adapted to control flow of liquid beverage through the faucet, the valve being coupled with and controllable by the actuator to open and close the valve. The actuator is in electronic communication with the communication interface and controller and is responsive to direction received from the communication interface and controller to open or close the valve. The modular component is sized, dimensioned, and configured to be retrofitted to an existing beverage dispensing system to replace an existing conventional manual beverage faucet.

In accordance with aspects of the prevent invention, the beverage dispensing system is can be a coffee dispensing system, a a beer dispensing system, and/or a carbonated beverage dispensing system.

BRIEF DESCRIPTION OF THE FIGURES

These and other characteristics of the present invention will be more fully understood by reference to the following detailed description in conjunction with the attached drawings, in which:

FIG. 9 depicts another simulated display of an operator interface of a dispensing apparatus of the present disclosure;

DETAILED DESCRIPTION

Figure 1:
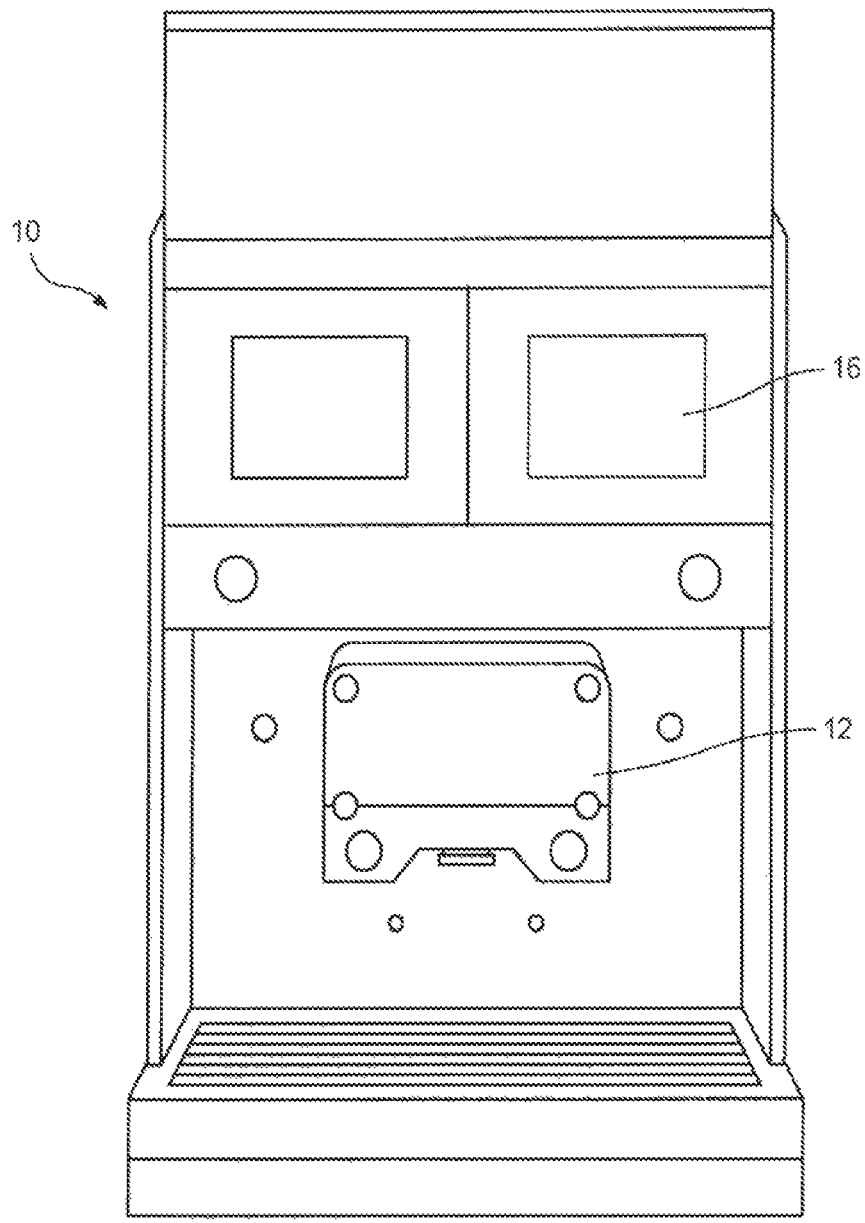
FIG. 1 illustrates an embodiment of a dispensing apparatus of the present disclosure.

An illustrative embodiment of the present invention relates to a modular component adapted to retrofit or be principally installed on a conventional liquid beverage dispensing system. The modular component includes a communication interface and controller, and a beverage faucet with an actuator. A valve is adapted to control flow of liquid beverage through the faucet, the valve coupled with and controllable by the actuator to open and close the valve. The actuator is in electronic communication with a communication interface and controller and is responsive to direction received from the communication interface and controller to open or close the valve. The modular component can be sized, dimensioned, and configured to be retrofitted to an existing beverage dispensing system to replace an existing conventional beverage faucet.

FIGS. 1 through 26, wherein like parts are designated by like reference numerals throughout, illustrate an example embodiment or embodiments of a modular component for installation on a liquid beverage dispensing system according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed, such as the size, shape, or type of elements or materials, in a manner still in keeping with the spirit and scope of the present invention.

The present disclosure provides a dispensing apparatus, "Smart Door" component, and/or "I-Kit" component for dispensing or injecting a flowable edible product into an item having a void or voids therein, or an item having low density suitable for receiving a flowable edible product. Such items may include pastries, baked goods, fruit, chocolate shells, as well as containers or beverage bottles. As used herein, the term "frozen edible product" is intended to encompass a cold, edible, and flowable substance such as ice cream, ice milk, frozen yogurt, sorbet, chiffon, frozen custard, pudding, mousse, and artificial edible product which generally has the consistency of "soft serve" ice cream. Furthermore, applications may include steps in the preparation of cupcakes, brownies, pies, chocolates, donuts, baked goods, cannoli shells, puffs, éclairs, pastries, cones, bowls, molded products (hollow), cups, sundaes, flavors, toppings, sauces, shakes and smoothies.

Now referring to FIG. 1, an embodiment of a frozen edible product dispensing and/or injecting machine, "Smart Door" component, and/or "I-Kit" component, providing controllable extrusion of a frozen edible product is shown. The machine, "Smart Door" component, and/or "I-Kit" component includes a housing having front, top, and side portions. An outlet port injecting and/or dispensing system 12 is located at the front of the machine, "Smart Door" component, and/or "I-Kit" component for extruding a frozen edible product. The dispensing and/or injecting apparatus, "Smart Door" component, and/or "I-Kit" component 10 may include one or more substantially identical yet independently operated dispensing and/injecting outputs. The machine, "Smart Door" component, and/or "I-Kit" component of the present disclosure generally includes an electrical system 14, an operator interface 16, a refrigeration system, a product preparation system, and the dispensing and/or injecting system 12. The electrical system of the apparatus, "Smart Door" component, and/or "I-Kit" component 10 has a control circuit that is programmable via the operator interface disposed on the machine, "Smart Door" component, and/or "I-Kit" component operator interface allows an operator to control extrusion of the frozen edible product.

Figure 2:
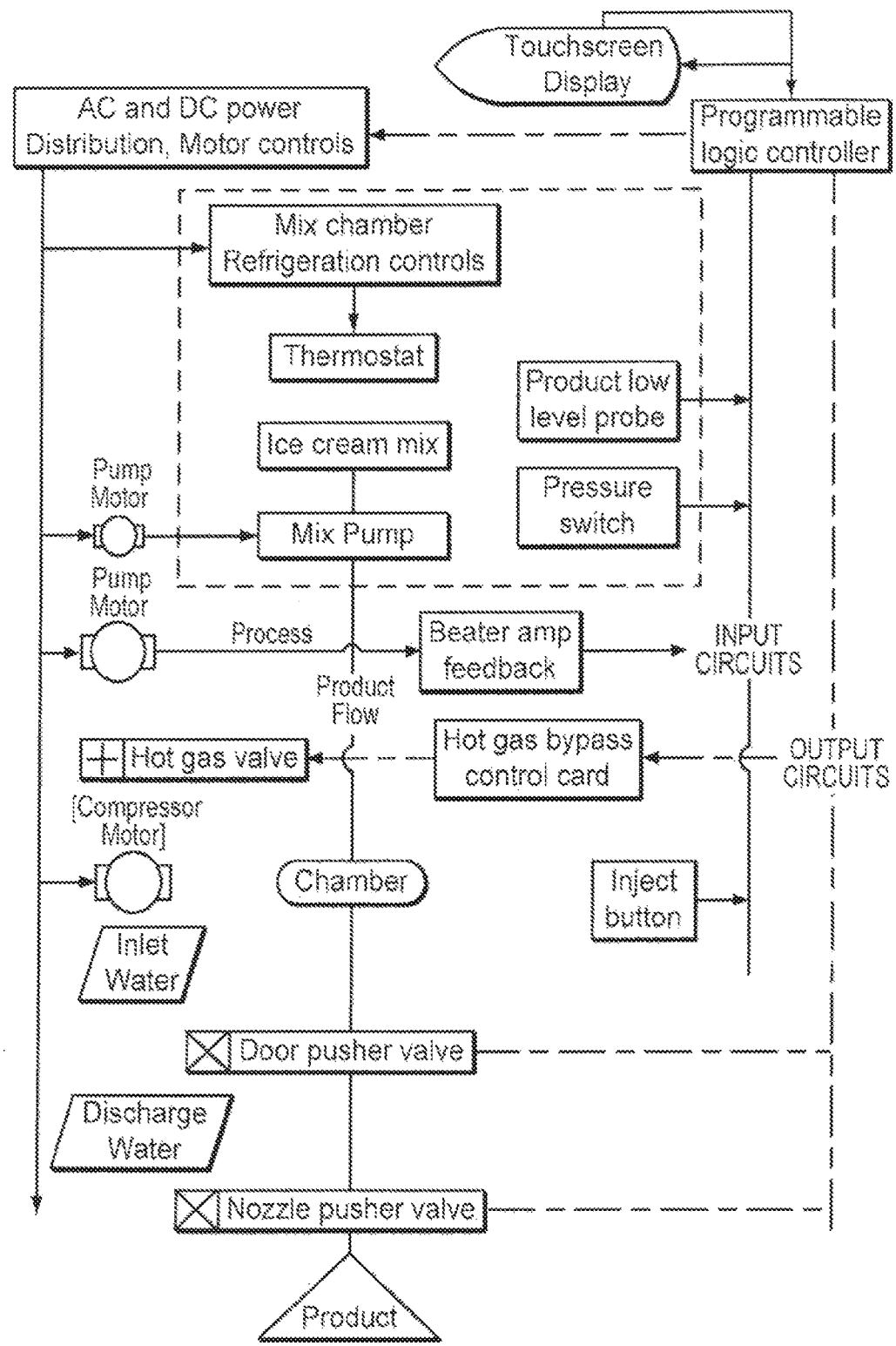
FIG. 2 depicts the interaction between the components of an embodiment of a dispensing apparatus of the present disclosure.
Figure 3:
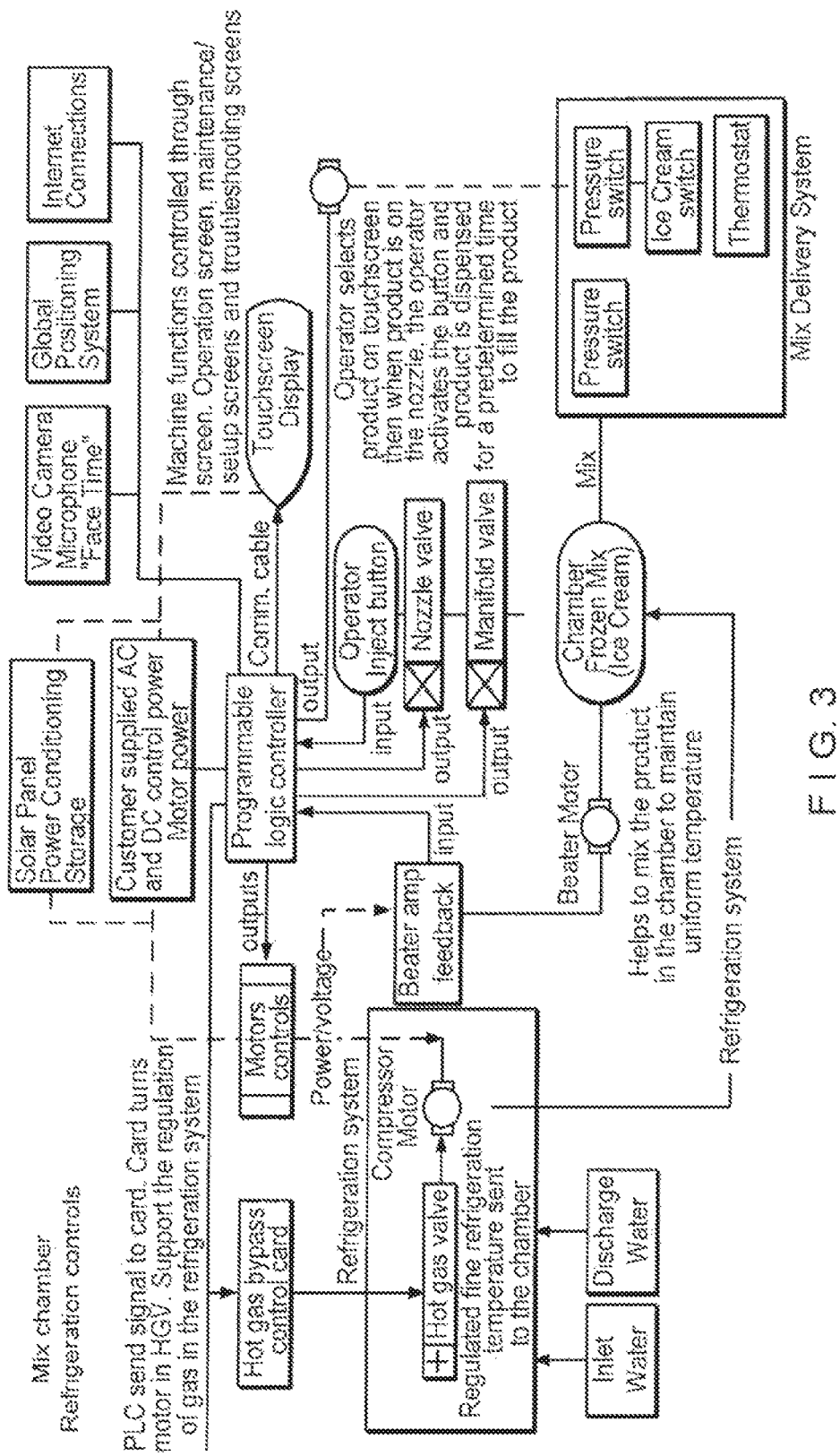
FIG. 3 is an additional diagram showing the interaction between the components of an embodiment of a dispensing apparatus of the present disclosure.
Figure 4:
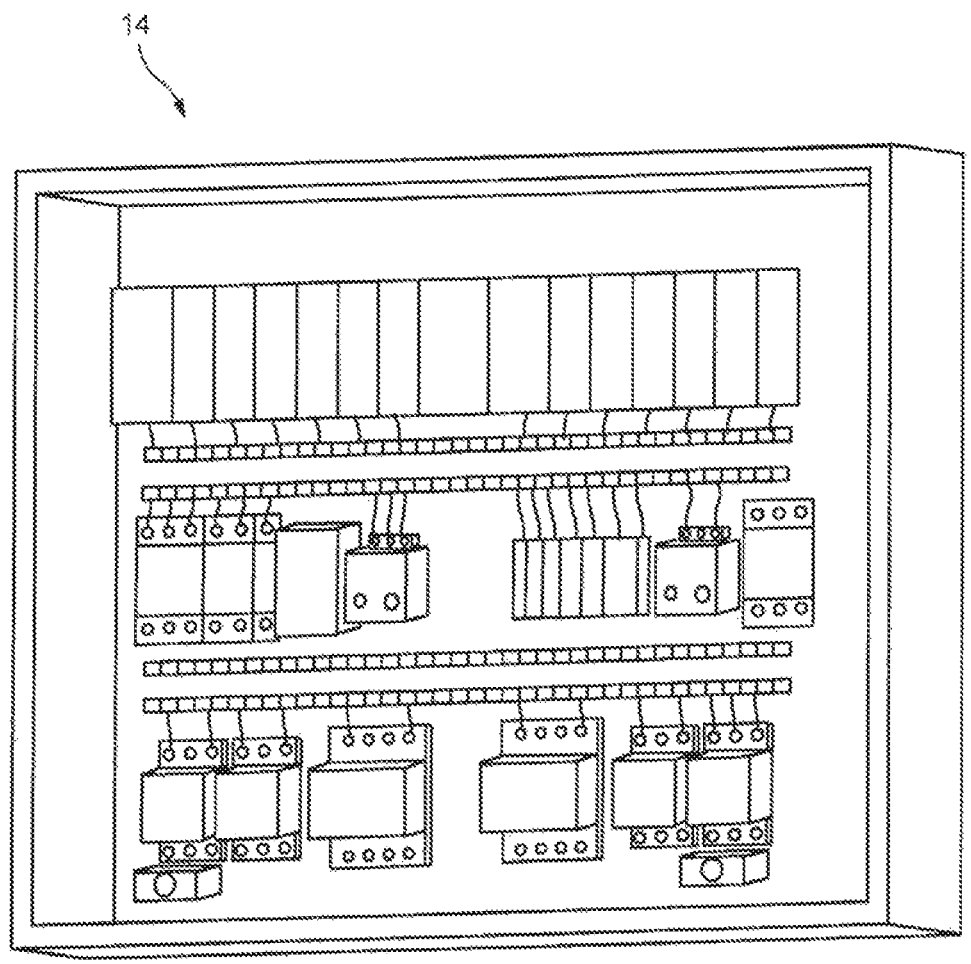
FIG. 4 illustrates an embodiment of an electrical system of a dispensing apparatus of the present disclosure.

Now referring to FIGS. 2 and 3, an exemplary block diagram of the electrical system providing control over various machine, "Smart Door" component, and/or "I-Kit" component is depicted. The electrical system may generally include a series of electrical components in communication with each other to power and/or control one or more of the various other components of the dispensing and/or injecting apparatus, "Smart Door" component, and/or "I-Kit" component. For example, now referring to FIG. 4, the electrical system may include a power circuit breaker that protects the electrical components of the dispensing and/or injecting apparatus, "Smart Door" component, and/or "I-Kit" component in general. A control circuit breaker may be provided to protect the power supplies and transformers of the dispensing and/or injecting apparatus, "Smart Door" component, and/or "I-Kit" component. The electrical system may also include a control power circuit breaker for protecting one or more compressors of the a dispensing and/or injecting apparatus, "Smart Door" component, and/or "I-Kit" component, as well as a current transformer for collecting the amperage or load of the beater motor (discussed below). The current transformer output may be connected to an analog input module of a programmable logic control (PLC) within the dispensing and/or injecting apparatus, "Smart Door" component, and/or "I-Kit" component, where the PLC may include a power supply such as a battery, as well as electronic storage medium. The electrical system of the present disclosure may further include a DC power supply for powering the components and systems of the dispensing and/or injecting apparatus, "Smart Door" component, and/or "I-Kit" component. One or more input and/or output cards may be provided for relaying and/or providing signals to the PLC, such as the output from current transformers and the like. The electrical system may include one or more transformers coupled to a hot gas valve controller, as well as a contact or for a compressor motor and a starter for a beater motor for controlling the power thereto. Further, as shown in FIG. 3, the electrical system may optionally include a solar power system, including a solar panel, power conditioning devices and a storage system.

The electrical system may be coupled to an optical sensor, motion sensor or other proximity activation element for initiating an extrusion cycle, as described below. Alternatively, a foot pedal or other suitable actuating mechanism may be integrated to initiate dispensing or injection of the edible product.

FIG. 3 further shows various envisioned data devices in communication with the programmable logic controller of FIG. 3. While a bus is illustrated as the communication path to the programmable logic controller, other possible wired or wireless communication paths may be used. The bus is in communication with an internet connection device, such as a router, an Ethernet card, a wireless transceiver, a wired connection or an unwired connection such as, but not limited to a cellular or similar device. This will provide communication to and from a central location which is critical for the functionality of many of the other elements operating via the bus to the programmable logic controller. This communication with a central location could include many topics including, but not limited to, transmission of identified service issues to a service technician prior to the technician's arrival at the site, inventory tracking and other data collection, data reception, data storage, data transmission (including transmission of video images), as well as an optional counter, typically resettable, for recording such total use information as number of shots of injecting, run time and total dispenses in order to determine total wear and tear on the apparatus, "Smart Door" component, and/or "I-Kit" component. Likewise, this could provide communication to a mobile or phone "app", so that the owner could monitor the operation of apparatus, "Smart Door" component, and/or "I-Kit" component components by his or her smartphone or other mobile device. Similarly, this could be set up so that a user could make the ice cream choice and/or select from the flavor enhancement system a topping, flavor, sauce, and/or mix-in(s), activate the machine, "Smart Door" component, and/or "I-Kit" component and pay for the ice cream, all by using his or her mobile device or smartphone. The bus may optionally be in communication with a global positioning system (GPS) device which can be used to determine the position of the apparatus, "Smart Door" component, and/or "I-Kit" component. In the event of loss, theft or unauthorized use of the apparatus, "Smart Door" component, and/or "I-Kit" component, this allows the owner to send a message to disable the apparatus, "Smart Door" component, and/or "I-Kit" component (such as, for instance, a message to the PLC to cease functioning [kill switch]) as well as to determine its position for recovery. The GPS device could have its own communication system or rely upon the cellular or similar communication of the internet connection device.

FIG. 3 further includes a video communication module, which would typically include a video camera, a microphone, a loudspeaker, and a "face time" application. Additionally, this video communication module could provide video images to the touch screen interface (see FIG. 13). This provides the possibility of many applications. A representative, but not exhaustive, list includes allowing a customer to "face time" a friend via a friend's mobile device to confirm what flavor of ice cream or other product the friend wants, allowing a customer to "face time" a central location to discuss flavor options or maintenance issues with an owner's representative, allowing an on-site maintenance person to "face time" with a person at the central office, allowing a person at the central office to see what is happening around apparatus, "Smart Door" component, and/or "I-Kit" component (that is, to provide surveillance that things are operating smoothly or to determine if apparatus, "Smart Door" component, and/or "I-Kit" component has been moved or is being operated improperly) and even, for some occasions, allowing a parent to provide a "face time" communication between a real or virtual clown or similar character and a small child. The video communication module could even provide a "wi-fi hot spot" in order to attract potential customers to its vicinity and even to allow customers to place an order (and even pay for) wirelessly through their smartphone or similar mobile device. Further, the combination of the microphone and the loudspeaker of the video communication module allows for audible controls, voice recognition, voice identification (allowing pre-approved users to order ice cream "on account" once their voice is identified) and verbal communication with the user.

This further provides for the ability of the machine, "Smart Door" component, "I-Kit" component, and the POS (point-of-sale) to communicate whereby an operator can select the desired item form the POS system and once the order is processed, the machine, "Smart Door" component, and/or "I-Kit" component will dispense/inject in accordance with the order and the order will be filled without further manual interaction. The POS system is further integrated to provide for the exchange of data for reporting or "crossing" information to maintain consistency in sales reporting, inventory tracking, ordering etc. This can be an automated process whereby the information is uploaded on a set time frame so that the information is readily available in real time. Another possibility for the video communication module is to include video storage in the video communication module so that instructional videos (such as, but not limited to, training videos for the maintenance and cleaning of the apparatus, "Smart Door" component, and/or "I-Kit" component) can be played over the video communication module.

The refrigeration system may generally include a pressure switch, cooling coils, a compressor, a hot gas mixing valve and a water pressure regulator. In the event a portion of the refrigeration system exceeds a predetermined or desired temperature, gas pressure, and/or any other types of pressure, flow rate may increase and thereby damage components of the apparatus, "Smart Door" component, and/or "I-Kit" component. To prevent such an event, the pressure switch may convey an indication of the temperature and/or pressure to the PLC, which may subsequently initiate a shut-down of one or more processes of the apparatus, "Smart Door" component, and/or "I-Kit" component, which may further include a visual indicator on the operator interface and/or mobile devices. The cooling coils may be integrated to cool hot gas created by the compressor, where the compressor may be operated to cool one or more chambers storing or containing the frozen edible product. The hot gas mixing valve may control or otherwise monitor the flow of gas through the apparatus, "Smart Door" component, and/or "I-Kit" component systems while the water pressure regulator may provide water flow through a portion of the system in proportion to the temperature and/or current operating parameters of the apparatus, "Smart Door" component, and/or "I-Kit" component. In particular, the hot gas valve may be controlled by an electronic circuit board in communication with the PLC and/or an analog input/output card. The beater motor amperage may be monitored as the input parameter for regulating the hot gas valve position. As hot gas is required to warm the product chamber, the PLC may signal the circuit board to open or close the hot gas valve to maintain a predetermined or preset amperage of the beater motor. By regulating the temperature of the chamber based on the amperage or operating condition of the beater motor, the frozen product is more likely to have a consistent texture and temperature, thereby ensuring repeatable quality of the product. Typical machines of the prior art often rely on a chiller or compressor to turn on and off at a particular time, where such timed operation decays as the system ages and result in inconsistent product conditions. Additionally, embodiments are envisioned which do not require hot gas for operation.

In addition, the refrigeration system may further include a mix chamber for mixing and/or otherwise processing a frozen edible product mixture into the desired state, where the mix chamber may be coupled to a thermostat, a mix chamber compressor, a mix chamber condenser, as well as a standby thermostat. The mix chamber thermostat may monitor and/or maintain the mix chamber temperature at or below a predetermined threshold at which the frozen edible product may be dispensed or injected, while the mix chamber compressor provides the cold air that chills or otherwise provides for a desired temperature of the mix chamber. In addition, the mix chamber condenser allows heated gasses created by the compressor to cool and run back into the compressor for subsequent cooling of the mix chamber. The standby thermostat may activate a chilling cycle when the apparatus, "Smart Door" component, and/or "I-Kit" component is placed in a standby mode. For example, once the mix chamber reaches a predetermined threshold, the thermostat senses and/or probes may signal the PLC to activate the compressor until a particular temperature is reached, upon which the operation of the compressor will cease until needed again.

The product preparation system of the apparatus, "Smart Door" component, and/or "I-Kit" component system of the present disclosure may generally include a mixing pump, a mixing pressure switch, a beater motor, a mixing pump motor, one or more pulleys and belts, and one or more level probes. The apparatus, "Smart Door" component and/or "I-Kit" component is capable of dispensing and/or injecting, soft-serve ice cream downwardly into open containers or can dispense and/or inject a frozen edible product, such as frozen yogurt, downwardly into an edible item. The mix pump may generally pump a liquid product used in preparation of the frozen edible product into a refrigeration chamber or mix chamber. When the mix pump has filled the chamber receiving the liquid product, the flow of the liquid product may activate a switch in the holding or mixing chamber, where the switch is activated at a predetermined pressure level to send a signal to the PLC, which subsequently discontinues pumping once the chamber has been filled to a particular level. The beater motor may be mechanically connected to a gearbox by the one or more pulleys or other similar mechanical coupling, where the gearbox is further coupled to a beater bar unit inside the product chamber. The motor causes the stirring of the bar while the liquid product is being chilled. To obtain a particular temperature and/or consistency of the frozen edible product being prepared in the mix chamber, the output or speed at which the beater motor is operating may be used as in indication or measure of the consistency and/or readiness of the product to be dispensed or injected. Upon appropriate freezing of the product and/or once the product reaches a desirable temperature for dispensing and/or injecting, it may be moved towards a portion of the chamber predisposed for dispensing and/or injecting. The level probes of the product preparation system may indicate when the mixing container has reached a low level, which may also be used to initiate a filling sequence by which additional liquid product is moved to the mixing container. In general, sensors, probes, flow meters and other measuring devices may be placed throughout the orifice(s), passageway(s), component(s), and various elements of product preparation system and throughout the apparatus, "Smart Door" component, and/or "I-Kit" component to monitor such process variables as temperature, air ratio, mix pump parameters, pressure and similar variables which are communicated to the PLC to adjust operation in order to assure product consistency and accurate portion control.

The downwardly oriented nozzle as compared to other nozzles, is envisioned to be typically easier to manufacture, more cost effective, simpler in design, easier to operate, and easier to interchange. It is further typically envisioned to provide a shorter distance from the mixing and/or holding chamber thereby resulting in a more direct and accurate dispensing and/or injecting as well as allowing for more versatility with respect to the type(s) of product(s) dispensed or injected and the viscosity of the product(s).

Figure 5:
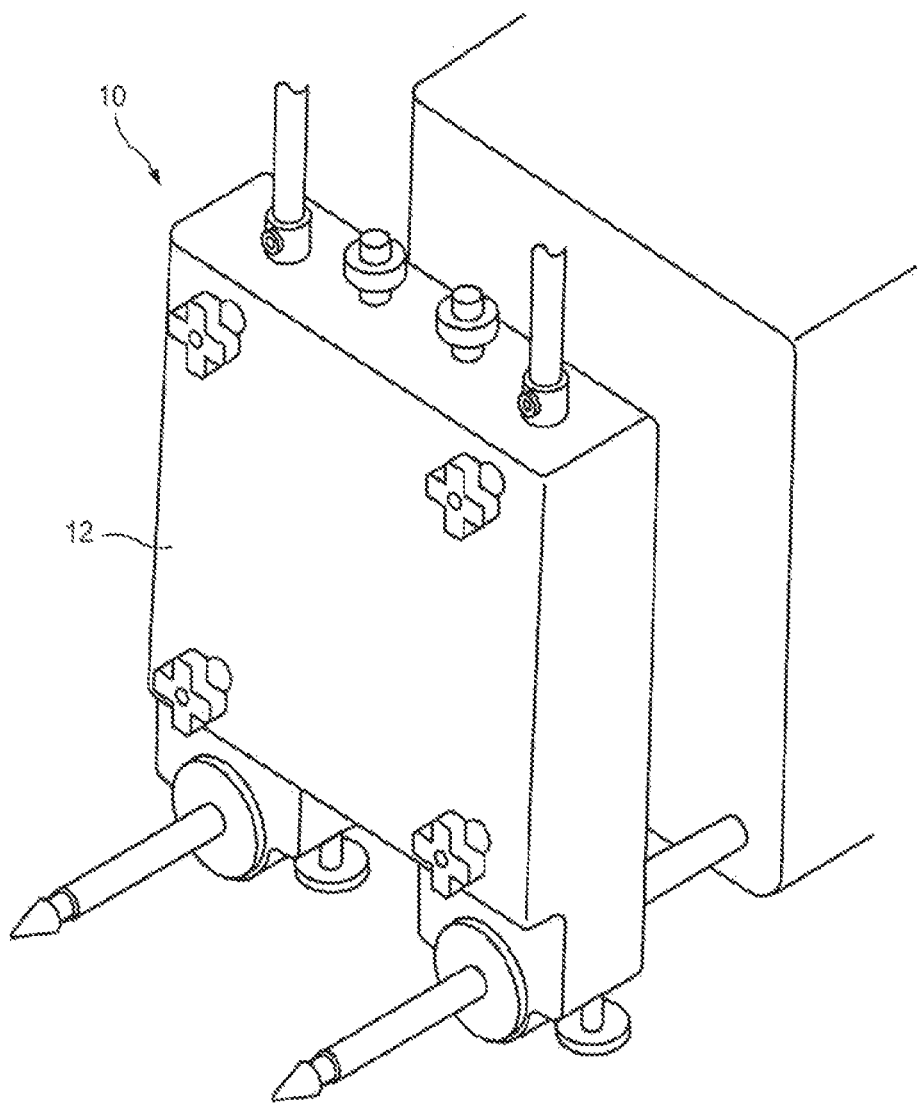
FIG. 5 shows an embodiment of a dispensing system of a dispensing apparatus of the present disclosure.
Figure 6:
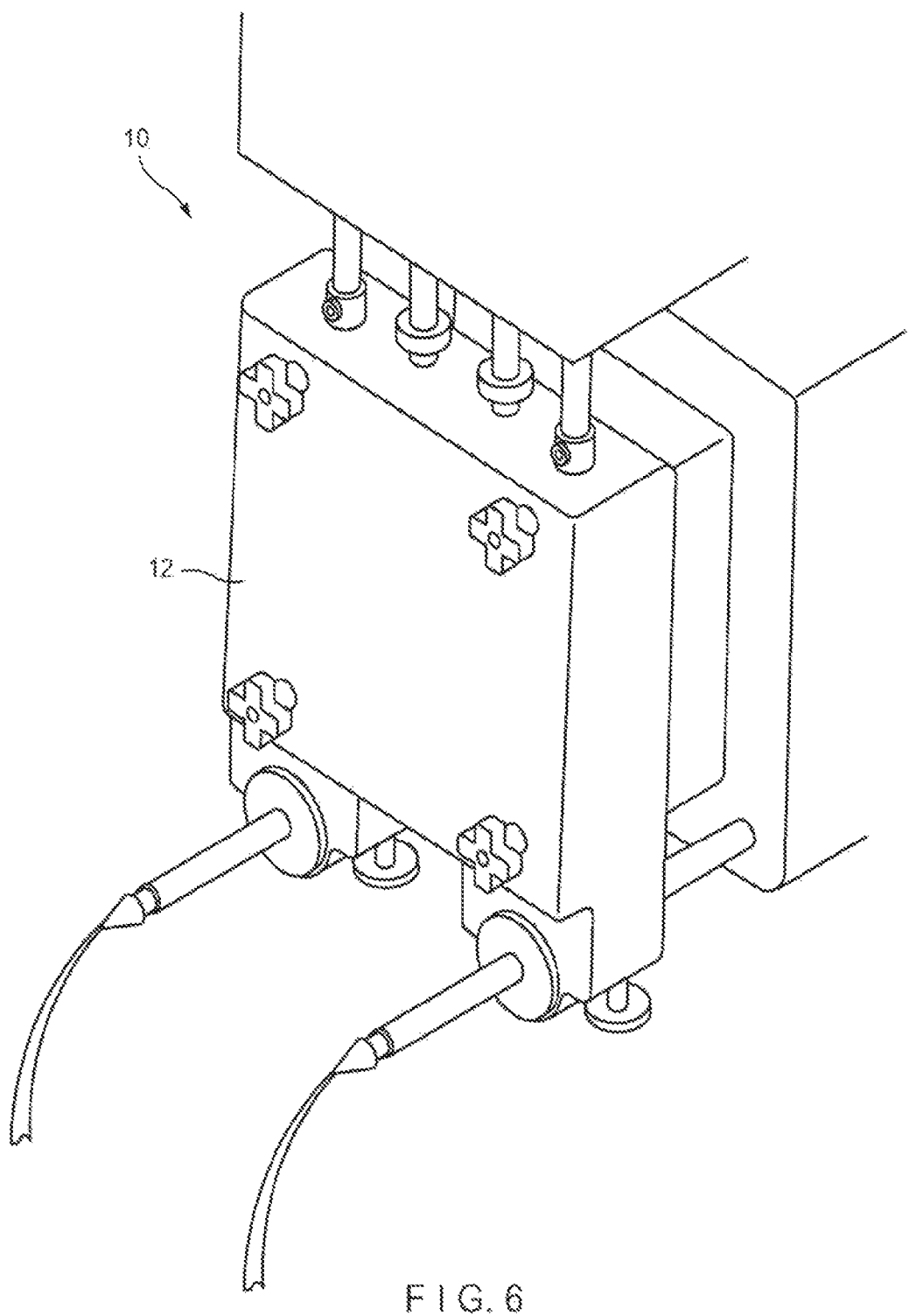
FIG. 6 depicts another embodiment of a dispensing system of a dispensing apparatus of the present disclosure.

Now referring to FIGS. 5 and 6, the dispensing and/or injecting system of the apparatus, "Smart Door" component, and/or "I-Kit" component may generally include a chamber manifold, a chamber automatic purge valve, a chamber air cylinder, a nozzle air cylinder, a nozzle solenoid valve, and a chamber solenoid valve. The chamber manifold may generally define a block or housing containing one or more dispensing and/or injecting control components and/or cavities therein. Within at least a portion of the manifold, a passage may be provided to allow any air built up during the dispensing and/or injecting process to be evacuated. The automated purge valve may allow the operator to remove the air by actuating the automated draw valve to allow the air to exit the bottom of the manifold. Timely evacuation of excess air build-up may provide an increased consistency with which provides product to be dispensed and/or injected. The purge valve may be automatically controlled by the control circuit such that air is released routinely according to a preset timing schedule, which may further ensure the consistency and desired state of the frozen edible product. It is envisioned that fully automated operation of the purge valve can optionally eliminate or reduce the need for manual purge valve operation. The chamber air cylinder and/or opens and closes the automated draw valve of the manifold to allow frozen edible product to proceed to the automated draw valve plunger. The nozzle solenoid valve may include an electro-pneumatic valve controlled by the PLC thereby providing the option of fully automated operation of the dispensing and/or injecting process, optionally eliminating the manual draw handle of the prior art. For example, the valve may be actuated such that air is switched into the nozzle air cylinder to open or close the automated draw valve. The chamber solenoid valve may also include an electro-pneumatic valve controllable in part by the PLC. When this valve is actuated, air may be switched in the chamber air cylinder to open or close the chamber automated draw valve. The automated draw valve may include o-rings or the like to adequately seal the movement of the automated draw valve in its respective passageways and/or orifices. When dispensing and/or injecting is desired, the automated draw valve retracts then extends, thereby injecting or dispensing the frozen product. The automatic draw valve is typically designed to prevent backflow.

Figure 7:
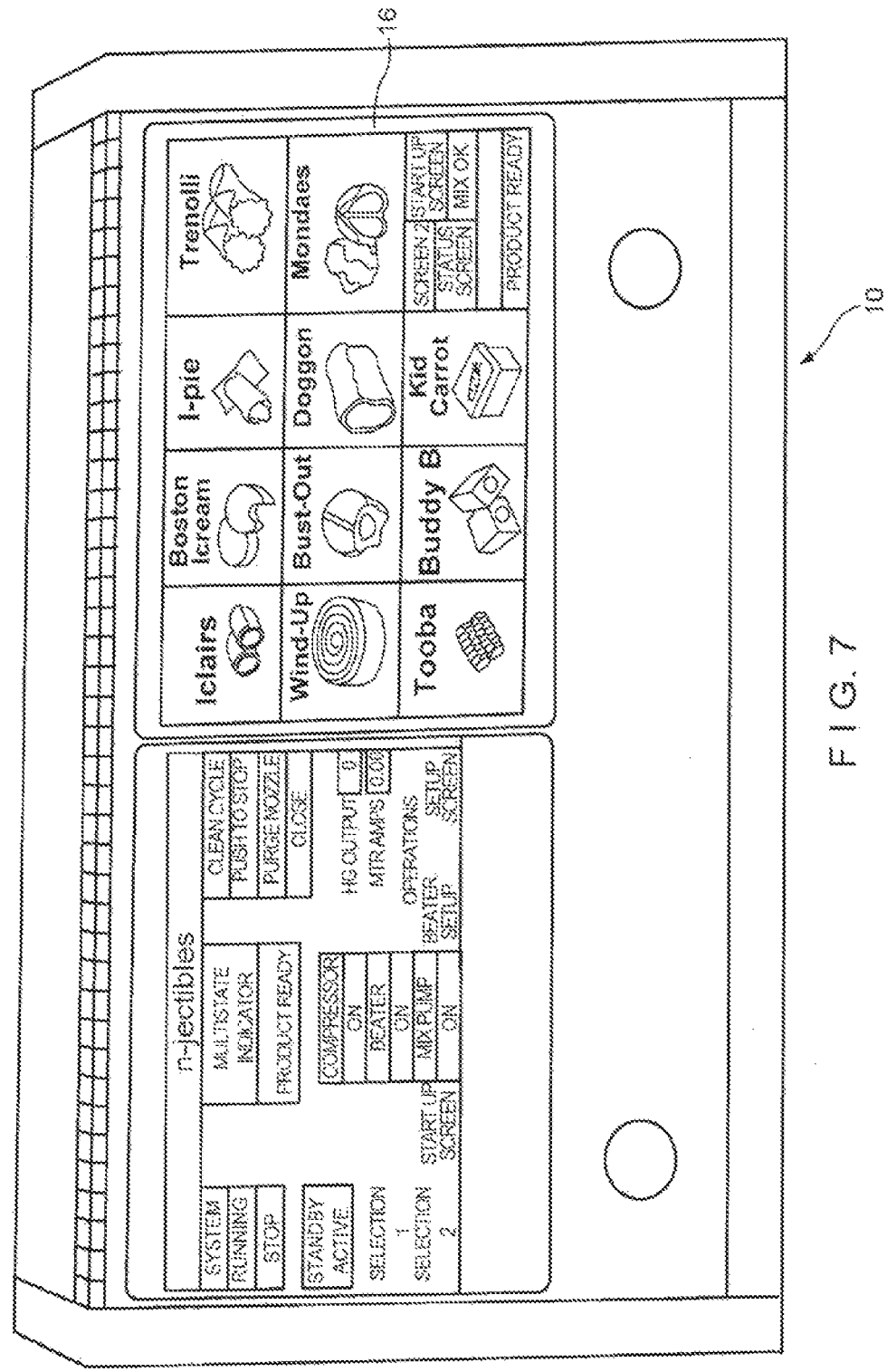
FIG. 7 illustrates an embodiment of an operator interface of a dispensing apparatus of the present disclosure.
Figure 8:
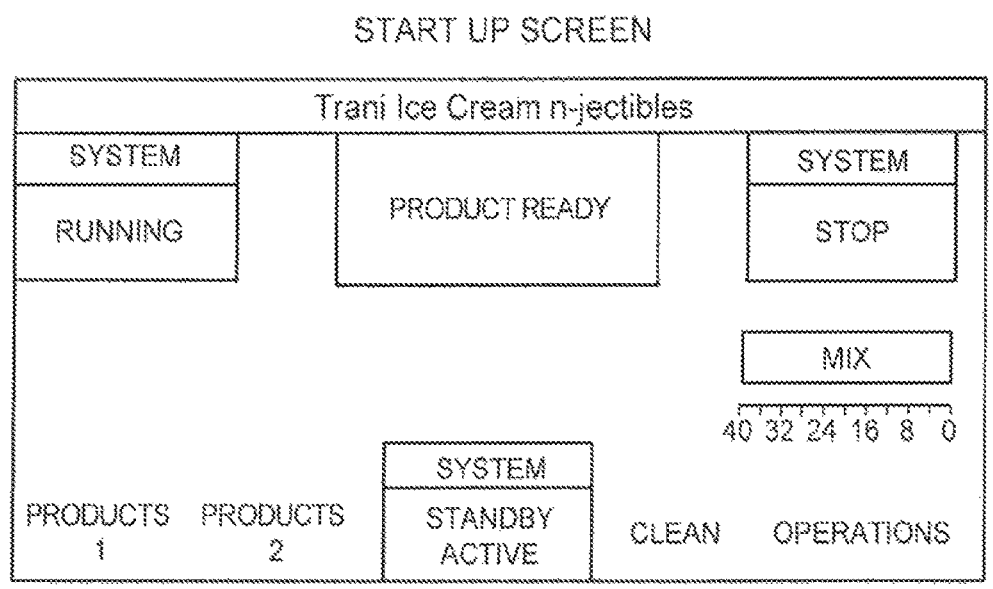
FIG. 8 shows a simulated display of an operator interface of a dispensing apparatus of the present disclosure.
Figure 10:
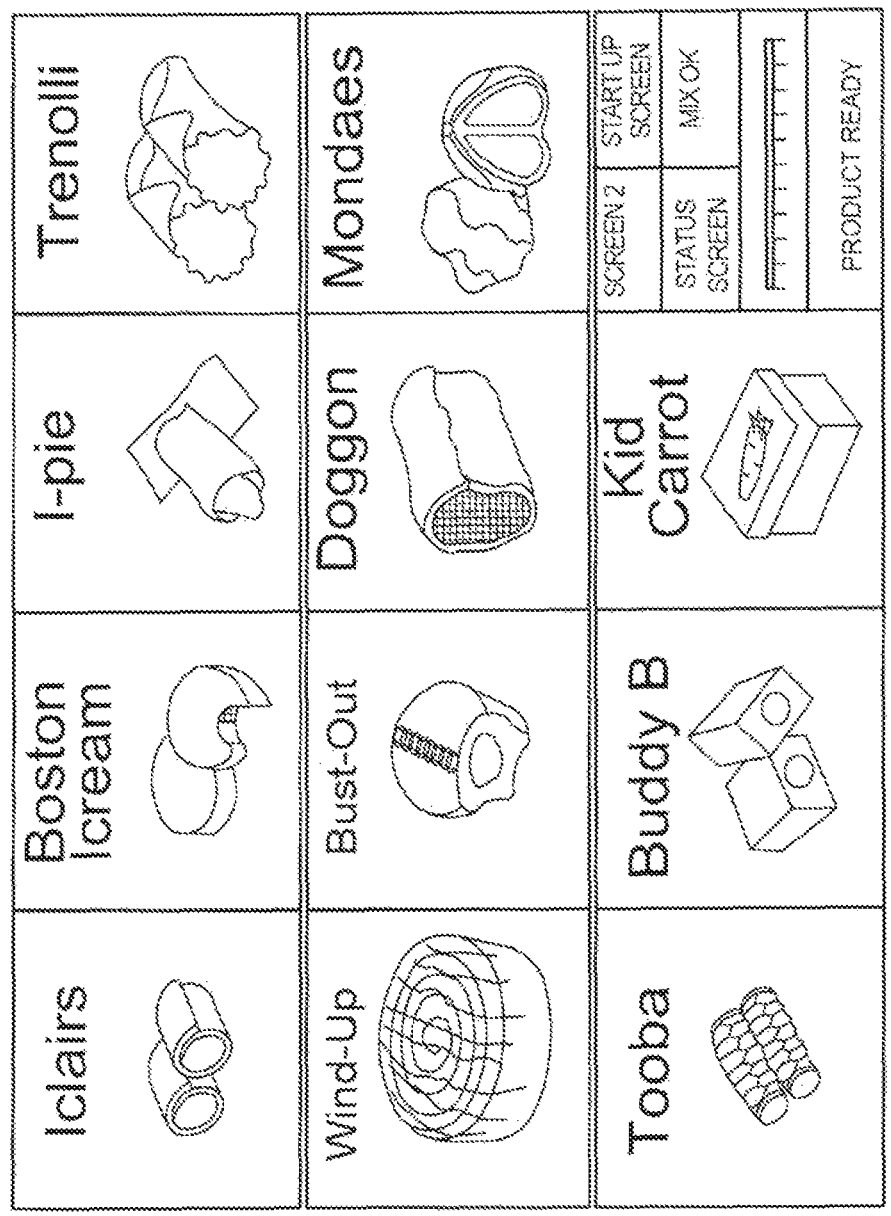
FIG. 10 illustrates an additional simulated display of an operator interface of a dispensing apparatus of the present disclosure.
Figure 11:
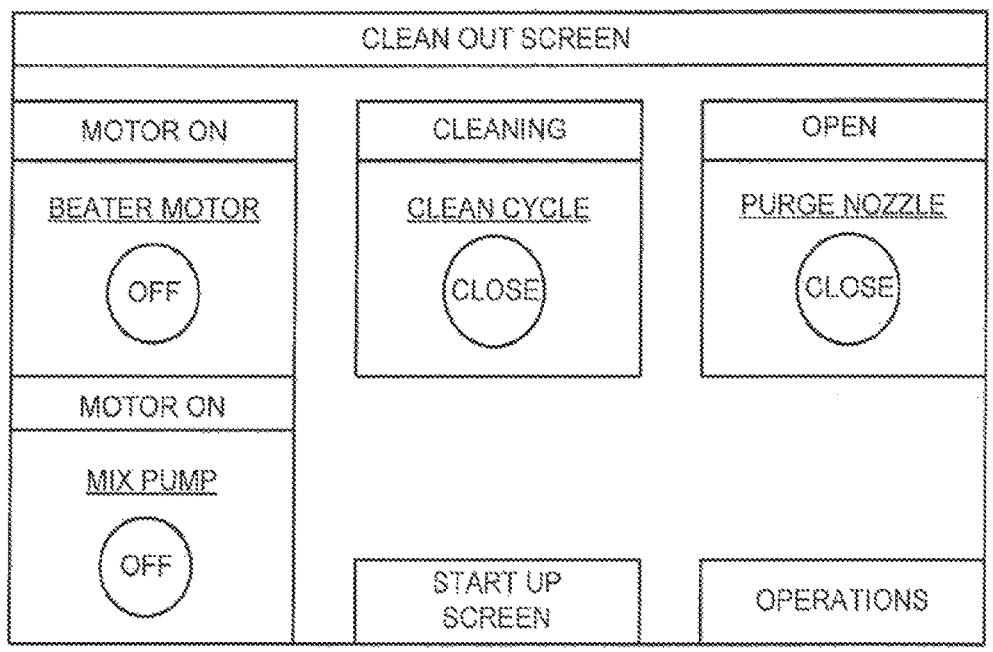
FIG. 11 shows still another simulated display of an operator interface of a dispensing apparatus of the present disclosure.
Figure 12:
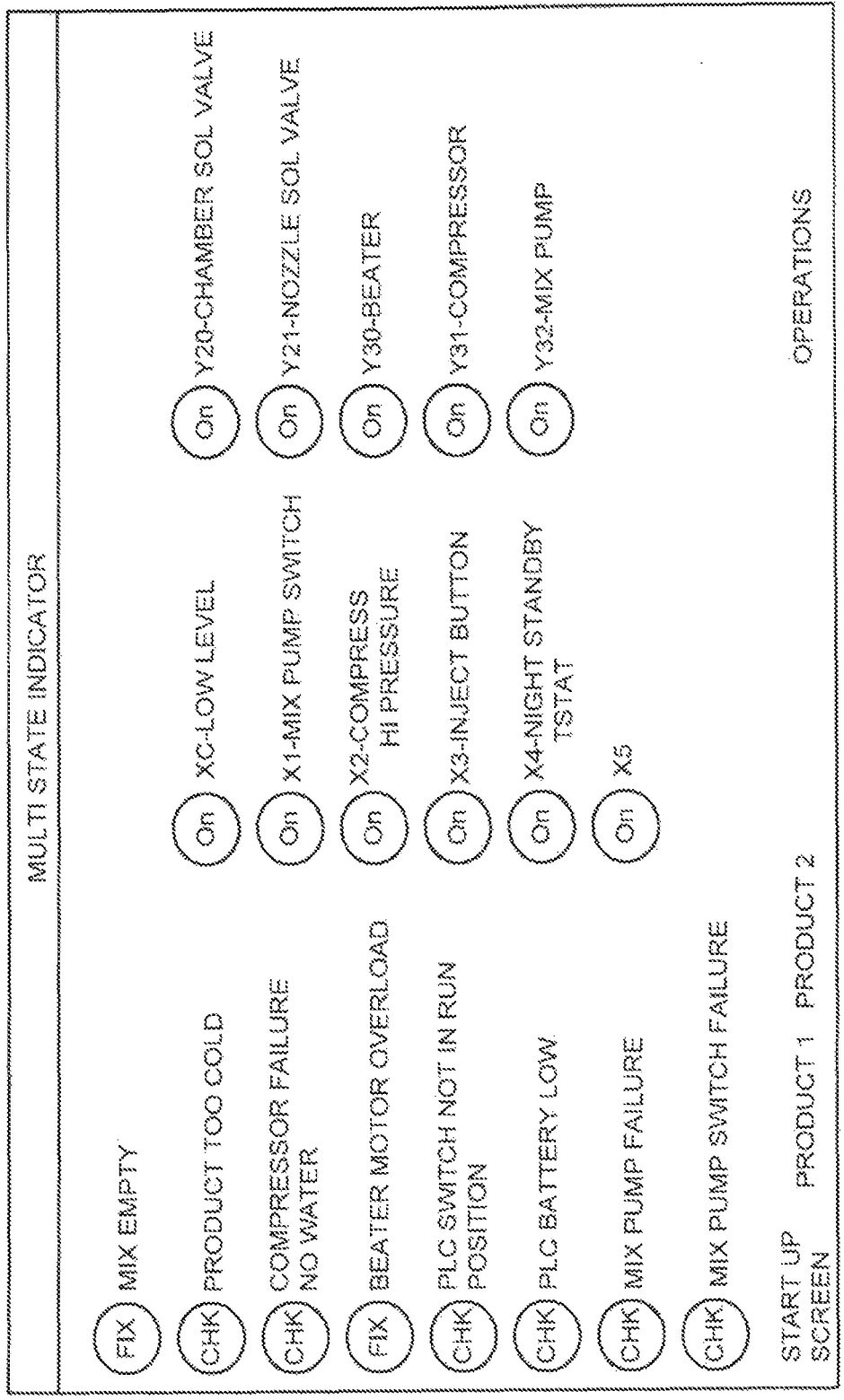
FIG. 12 depicts another simulated display of an operator interface of a dispensing apparatus of the present disclosure.

Now referring to FIG. 7, the operator interface is coupled to the electrical system to provide a means for an operator to input parameters for controlling operation of the machine, "Smart Door" component, and/or "I-Kit" component. The operator interface of the dispensing and/or injecting machine, "Smart Door" component, and/or "I-Kit" component may generally include a visual display, such as a touch screen LCD or the like, and may generally include controls to start, stop and/or pause the machine, "Smart Door" component, and/or "I-Kit" component, or any individual component thereof. The visual display may be coupled to or otherwise include a memory component for storing programmed images, menus, and/or other operating functions (wherein the menu may vary for each store). The visual display, which can be a video display (even a 3-D display, wherein images are viewable in three dimensions), can display many different things, with typical display items including identification of the internal product, nutritional information, ingredient information, calories, fat content and allergen information (as well as implementing the "face time" or similar operations described above) as well as advertising. The operator interface may further include an optical or proximity sensor or a motion sensor for initiating the dispensing or injecting process (which may be dispensing and/or injecting controlled by user motion which is proximate to, but free of contact with, the apparatus, "Smart Door" component, and/or "I-Kit" component) of the apparatus, "Smart Door" component, "I-Kit" component, as described above. The operator interface unit can provide additional information such as temperature of the frozen edible product via a digital readout. The operator interface unit can be located on or in the machine or at a remote location. The operator interface can be directly connected to the electrical system or can transmit signals to be received by the electrical system, i.e. "wireless". In one embodiment, the operator interface unit is located on a top portion of the machine, the "Smart Door" component, and/or "I-Kit" component and the electrical system is contained within the housing of the apparatus, "Smart Door" component, and/or "I-Kit" component system. The electrical system is coupled to the operator interface to receive and store the various control parameters input by an operator. Similarly, the operator may choose, via the touch screen of the operator interface, a desired viscosity of the dispensed and/or injected flowable product (the term "flowable product" may include "frozen flowable product"), and the apparatus, "Smart Door" component, and/or "I-Kit" component, via regulation, adjustment and/or modification of temperature, mixing speeds, overrun (i.e., the amount of air in the product) and/or similar characteristics upon which the viscosity depends, would adjust the viscosity and/or flow rate of the flowable product in accordance with the operator's request. In this regard, a user may have their own formula of ice cream/yogurt mix (or similar) that will be loaded in the machine, "Smart Door" component, and/or "I-Kit" component, or they may want a different end product from stock formulas. As a result, a user will want a custom program cycle separate from the pre-programmed cycles in order to produce their own style product. Therefore, these programmable custom recipes can be loaded into the machine, modular door, and/or "I-Kit" component and stored in the memory and sent to each store via wireless or similar communication so that the brand is consistent at one or multiple outlets. Likewise, the loading of data can be done with a memory stick or portable hard-drive. The electrical system can implement the desired control using discrete components, timer integrated circuits, processors and/or programmable devices, as described above. The operator interface and/or electrical system may include one or more security measures (secured system) to restrict tampering of preset parameters and/or (password protected) to authorized individuals only. The wireless system can also be used to alert a service technician as to any problems arising on the machine, "Smart Door" component, and/or "I-Kit" component, even by identifying the necessary parts for repair. Data such as operations manuals, electrical diagrams, parts lists, repair/service logs can further be implemented and communicated. The wirelessly communicated data can further include, but is not limited to, smart tags, images, 3-D images, audio files, video files, web sites, advertisements, menu items and recipes. Moreover, the use of wireless communication to a central location, particularly in combination with large-scale data storage, such as, but not limited to "cloud" storage, allows for a vast and comprehensive database, as well as historical record, to be generated, including the liquid mix to finished product quantifying yield for a given device. All injections and dispenses can be sub-classified into categories like flavors, toppings, sauces, cupcakes, cups, cones, bowls, sundaes, shakes, smoothies, etc. Information can be displayed by size (e.g., small, medium, large). Likewise, historical information regarding the total volume on a daily weekly, monthly or annual basis can be implemented. Similarly, extensive cleaning and service logs, as well as similar reports, may be generated and stored for future use.

The operator interface 16 may include programmed procedures, protocols and/or other operating parameters to ease use of the apparatus, "Smart Door" component, and/or "I-Kit" component, as well as to remove the likelihood for operator error or inconsistencies which could lead to substandard product preparation. For example, the operator interface may include automatic, preset procedures for initial apparatus, "Smart Door" component, and/or "I-Kit" component startup, product dispensing and/or injecting, apparatus, "Smart Door" component, and/or "I-Kit" component cleaning cycles, and/or hibernation or "overnight" modes by which the apparatus, "Smart Door" component, and/or "I-Kit" component may operate, as illustrated in the simulated visual displays of FIGS. 8-12. Typical dispensing machines of the prior art included various steps that were manually required for the proper preparation, dispensing, and even cleaning of a particular machine. For example, to prepare the mix into a desired frozen state, perhaps a particular temperature had to be reached, while airflow and hot gas were manually controlled at particular instances by an operator, i.e., "bleed excess air," "then turn on compressor," "wait approximately two minutes, then turn on pump," etc. The outcome of such procedures could widely vary depending on how accurate the operator is in following them, and the likelihood for errors and/or inconsistencies is very high. With the apparatus, "Smart Door" component, and/or "I-Kit" component of the present disclosure, the various events and components needed to be activated, and any timing schedule for doing so, may be predetermined and programmed into the electrical system. For example, once the optimal parameters for a particular operation are determined, i.e., initial product preparation, the memory of the PLC may be programmed with the desired routine to provide the optimal result, in this case being the preparation of a product having consistent, repeatable qualities and characteristics. As such, the chance that operator error or inaccuracies will affect the product output is virtually eliminated. The apparatus, "Smart Door" component, and/or "I-Kit" component of the present disclosure may include a display on the operator interface that allows for a one-touch or single action initiation of the product preparation procedure, and may further include a visible indication of when the product has been prepared and is thus ready for dispensing and/or injecting. Moreover, the apparatus, "Smart Door" component, and/or "I-Kit" component may have plurality of production protocols or profiles for variations in mix types. For example, particular flavors, toppings, sauces and/or types of mixes may have different optimal preparation parameters as far as temperature, beater speed, duration, etc. The apparatus, "Smart Door" component, and/or "I-Kit" component may include these varying profiles such that an operator need only identify the particular mix being used before initiating a production sequence.

In addition to inconsistencies in product preparation, previous dispensing machines would also vary widely in the actual amount of product dispensed, as the dispensing was typically controlled manually by an operator, i.e., by pulling a lever or the like. As a result, the actual amount or volume of dispensed product could be directly affected by the operator. The apparatus, "Smart Door" component, and/or "I-Kit" component of the present disclosure may include automated nozzle adaptors, automated nozzles, automated guillotine valves, automated draw valves, automated draw valve plungers, and/or types of valves as described above that are either electrically wired, wireless and/or pneumatically controlled to travel a preset distance, thereby dispensing and/or injecting a uniform and accurate volume and/or amount of product. Moreover, the operator interface may include a menu of items, where each of the items available for use with the dispensing and/or injecting apparatus, "Smart Door" component, and/or "I-Kit" component have a predetermined, preset amount or volume of dispensed and/or injected product associated with them. For example, the operator interface may include a display for an LCD or touch screen having a plurality of available edible products illustrated, where each of the available product has a predetermined volume or amount of frozen product associated with it. The preset, predetermined frozen edible product amounts correlating to a particular edible product for use with the apparatus, "Smart Door" component, and/or "I-Kit" component may be stored in the memory of the PLC. Moreover, the preset volume and/or amount of frozen edible product(s) may further include parameters for operating the automated nozzle adaptor, automated nozzle and/or automated draw valve of the apparatus, "Smart Door" component, and/or "I-Kit" component to actually dispense or inject the predetermined amount. For example, upon selecting a desired product from the menu, the PLC may then convey a signal to the automated nozzle adaptor, automated nozzle and/or automated draw valve to move a preset distance and/or to dispense and/or inject for a preset amount of time, thereby providing a consistent, desired volume time and time again for a given product.

For cleaning of a particular dispensing and/or injecting machine, "Smart Door" component, and/or "I-Kit" component, a protocol or procedure having various manual steps may typically be required. For example, instructions for cleaning may include such steps of "turn off refrigeration," "replace mix container with water or cleaning solution," "attach hose to nozzle so that water passed through the nozzle adaptor and/or nozzle, can be directed to a drain or similar device", "automated cycle nozzle adaptor, automated nozzle, and/or automated draw valve until water exits nozzles," etc. Similar to the product preparation stage, the efficacy and/or thoroughness of a particular cleaning cycle may vary widely depending on the accuracy of an operator to follow the instructions and complete each step as described. With respect to the present apparatus, "Smart Door" component, and/or "I-Kit" component, the particular parameters and/or settings with which the components of the apparatus, "Smart Door" component, and/or "I-Kit" component should operate to properly and thoroughly clean the apparatus "Smart Door" component, and/or "I-Kit" component may be preprogrammed and/or saved in the memory of the PLC. As such, an operator need only actuate a cleaning cycle via the operator interface, which may simply include a single button on the touch screen (i.e., "one touch start up"). Once actuated, the preset program may run, i.e., refrigeration may be deactivated, the automated nozzle adaptor, automated nozzles, and/or automated draw valve may be cycled to dispense and/or inject unused frozen product for a predetermined period of time, the beater motor may be deactivated, systems diagnostics, real-time data collection and monitoring may be activated (which may include "cloud-based" data, transmitted either wired or wirelessly), remaining mix levels and product tracking calculations may be determined, etc. The efficiency of the cleaning cycle, and the parameters associated therewith, are very important for protecting the image of the business. Therefore, typically, parameters associated with cleaning cycle are protected by a separate password protected screen and available only to selected technicians and personnel (likewise, critical parameters such as recipes and standard portions may be similarly protected, [secured system]). As a result, an optimal, predictable and repeatable cleaning procedure may be easily performed, regardless of operator efficiency or skill The dispensing and/or injecting apparatus, "Smart Door" component, and/or "I-Kit" component may further include a standby mode in which it is not necessary for the machine, "Smart Door" component, and/or "I-Kit" component to have frozen product ready for dispensing and/or injecting for a prolonged period of time (i.e., overnight, days when store is closed, etc.). In this standby or hibernation mode, the beater motor may be deactivated so that any mix in the mixing container is not being agitated. Moreover, the refrigeration system may be set to a temperature higher than that of normal operating conditions when frozen edible product is being made, but remaining low enough that the ingredients in the apparatus, "Smart Door" component, and/or "I-Kit" component do not risk being spoiled or contaminated due to warmth. As such, the apparatus, "Smart Door" component, and/or "I-Kit" component may remain in this standby mode for a prolonged duration without the need to clean the machine, "Smart Door" component, and/or "I-Kit" component and without spoiling or contamination. In addition, by modifying the temperature requirements and ceasing operation of the beater motor, the apparatus, "Smart Door" component, and/or "I-Kit" component will thereby consume less energy and/or water compared to when the apparatus, "Smart Door" component, and/or "I-Kit" component is in normal operation. Once normal operation of the apparatus, "Smart Door" component, and/or "I-Kit" component is again desired, the apparatus, "Smart Door" component, and/or "I-Kit" component may or may not simply purge the cooled ingredients and draw fresh mix into the mixing container for preparation of a fresh batch of frozen edible product. Subsequently, the refrigeration system may once again lower the temperature to an appropriate production level, and the beating motor will be activated as well. The standby mode allows the apparatus, "Smart Door" component, and/or "I-Kit" component to reach production quicker than would otherwise be possible if the apparatus, "Smart Door" component, and/or "I-Kit" component was simply shut down completely, which would also necessitate cleaning and therefore involve a longer downtime.

The operator interface may further include visible indicators of the status and/or condition of the various operating parameters of the apparatus, "Smart Door" component, and/or "I-Kit" component, including data regarding time of use, product temperature, mix levels, and/or diagnostic information regarding particular components of the apparatus, "Smart Door" component, and/or "I-Kit" component. For example, the operator interface may include a beater status display listing the rpm or amperage of the beater motor, as well as the setpoints or targets at which the beater and/or motor should operate. In addition, should a particular component of the apparatus, "Smart Door" component, and/or "I-Kit" component being operating outside of a predetermined parameter or range, or cease to operate at all, the operator interface may provide a visual signal or indication of a system malfunction or error.

During typical use, frozen product may proceed from the mixing chamber to the manifold chambers until dispensing and/or injecting is commenced. An operator may select a desired product from the menu shown on the operator interface and/or mobile devices. Upon selection of the desired item, the apparatus, "Smart Door" component, and/or "I-Kit" component may correlate the selection to a predetermined volume or amount of frozen edible product to be dispensed or injected, and the PLC may convey appropriate control signals to the components of the apparatus, "Smart Door" component, and/or "I-Kit" component to in preparation of dispensing and/or injecting the predetermined amount. Once dispensing and/or injecting is desired, the operator may actuate the optical or proximity sensor. The PLC and/or electrical system detects activation of the sensor and causes the automated nozzle adaptor, automated nozzles and/or automated draw valves to be energized for a predetermined amount of time or to travel a preset distance, where the time and/or distance corresponds to a selected volume of frozen edible product to be extruded from the machine, "Smart Door" component, and/or "I-Kit" component. In a single-stroke embodiment, the automated draw valve retracts then extends, thereby dispensing and/or injecting the predetermined amount of frozen product associated with the selected item out of the orifice, nozzle adaptor, and/or nozzle. The automated draw valve may be actuated pneumatically or electrically, and may include a tapered or bullet-nose shaped tip to ease the piercing of certain edible products. In a two-stroke embodiment of a dispensing apparatus, horizontal and vertical plungers may be pneumatically or electrically retracted for a specific, predetermined amount of time, thereby setting a specific amount of frozen product to be dispensed. During and/or after activation of the plungers, the PLC may energize the mix pump to cause mix to flow from the mix receptacle to the mixing chamber to replace the dispensed amount of frozen product. Optionally, the PLC may monitor the temperature of the nozzles and send signals to control the temperature of the nozzles (for example, by hot gas or by electrical devices) if, for instance, the viscosity or flow rate of the product is unsatisfactory, or if the ambient temperature is outside of the normal ambient temperature.

Similarly, the product settings are typically adjustable and programmable so that desired product and characteristics are achieved, by controlling and programming the beater function and speed, controlling and adjusting overrun, and controlling temperature, all typically in connection with the interface, automated passageways, automated orifices, automated nozzle adaptor, automated nozzle, automated draw valve plunger, automated guillotine valve, and/or automated draw valve.

Throughout the use of the apparatus, "Smart Door" component, and/or "I-Kit" component, various information regarding the time of use, quantities distributed, particular status of the various components, and the like of the apparatus, "Smart Door" component, and/or "I-Kit" component may be recorded and stored in the memory of the apparatus, "Smart Door" component, and/or "I-Kit" component, and may further be transmitted via the communication device to a central clearinghouse and/or corporate entity for review and analysis. In addition, the trends and indicated uses of the apparatus, "Smart Door" component, and/or "I-Kit" component may be used in establishing a supply schedule or the like for optimal incorporation and use of the apparatus, "Smart Door" component, and/or "I-Kit" component for a particular business.

In addition to the above embodiments, the dispensing and/or injecting apparatus, "Smart Door" component, and/or "I-Kit" component may further be used to dispense and/or inject flowable edible products, single and/or in combinations such as flavors, toppings, sauces, puddings, soft serve mixes, sodas, fresh or frozen yogurts, smoothies, or other foods into, on, or within inedible items such as plastic or paper cups, plastic containers, such as bottles, glass containers, or other items sized to receive a portion of the flowable product. For example, using the methodology and apparatus, "Smart Door" component, and/or "I-Kit" component discussed above, yogurt may be dispensed and/or injected, or combined with two or more flowable products (above) deposited or injected into a cup for consumption. The amount of edible product deposited and/or injected within or on the inedible product may be predetermined as discussed above or may be manually determined by the operator. For example, a lever may be manually operated by the operator to dispense an amount of yogurt into a cup, or alternatively, actuating the operator interface may dispense either a predetermined amount of yogurt or an operator specified amount of yogurt into a cup depending upon the order from the customer. If an edible product such as an ice cream cone is selected, the automated passageway, the automated orifice, the automated nozzle adaptor, the automated nozzles, the automated drw valve, and the automated draw valve plunger of dispensing and/or injecting apparatus may penetrate the air space within the cone to deposit or inject the flowable edible product within the interior of the cone or a cup in an inedible product is selected.

The operator interface 16 may further display one or more inedible item images, for example, a container such as a cup or bottle, with one or more volumes of each. For example, 6 oz or 16 oz cup (a typical range of available product sizes may be from a fourth of an ounce to thirty ounces) may be displayed and selected by the user for the flowable edible product to be dispensed and/or injected into. Optionally, the operator interface may include both visual and audio indicators of edible and inedible items to be selected. For example, the operator interface and/or mobile devices may include a speaker which audibly identifies which products, edible or inedible are available for dispensing and/or injecting. Additionally, operators may select items for selection by speaking the particular edible or inedible item for selection. For example, the operator may state "cone" and "strawberry yogurt" for selection whereby the dispensing and/or injecting apparatus, "Smart Door" component, and/or "I-Kit" component may dispense and/or inject a predetermined or operator selection amount of strawberry yogurt into the cone.

Optionally, the operator interface may be in communication with the programmable controller through a wireless remote controller with a wireless transmitter for communication with the programmable controller. For example, the operator interface on the remote control may include indicators such as numbers, images, or other indicators on a display on the remote control, which may include a keypad with push buttons or touch screen activators. The same display may also be included on the display of the dispensing and/or injecting apparatus, "Smart Door" component, and/or "I-Kit" component, which indicates a particular edible and inedible item for selection. When a particular edible or inedible item is selected, the remote controller signals the dispensing and/or injecting apparatus, "Smart Door" component, and/or "I-Kit" component to dispense and/or inject a predetermined amount flowable product into the selected edible and/or inedible item.

Figure 13:
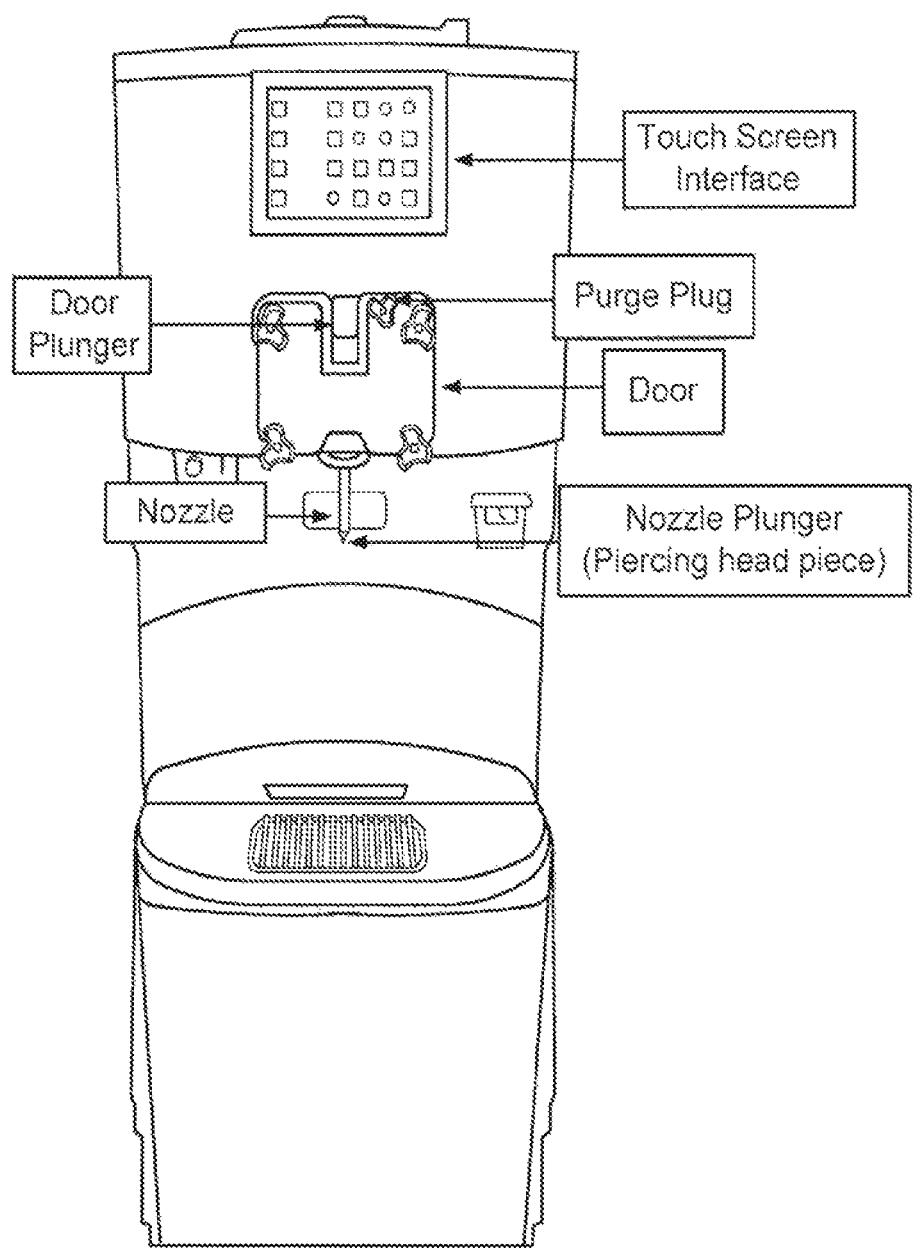
FIG. 13 depicts another embodiment of a dispensing system of a dispensing apparatus of the present disclosure.

Now referring to FIG. 13, where an alternative embodiment of the dispensing and/or injecting apparatus, "Smart Door" component, and/or "I-Kit" component is shown. In this configuration, the automated guillotine valve, the automated passageway, the automated orifice, the automated nozzle adaptor and/or automated nozzle which dispenses and/or injects the yogurt, frozen yogurt or other flowable and/or at least substantially frozen edible item is dispensed and/or injected, is oriented in a vertical orientation with respect to the dispensing and/or injecting apparatus, "Smart Door" component, and/or "I-Kit" component. In particular, the automated nozzle and/or automated draw valve plunger, which may include a tapered tip for piercing edible and/or inedible products, is substantially parallel to the major axis defined by the height of the dispensing and/or injecting apparatus, "Smart Door" component, and/or "I-Kit" component. The automated passageway, the automated orifice, and the automated nozzle adaptor could have a device or a piercing object on one side or the other on the components or somewhere on the component, piercing the product and these components can act as a dispensing and/or injecting alone without other components.

One or more automated nozzle adaptors and automated nozzles may be included in the same or substantially same vertical orientation as the automated nozzle adaptor and automated nozzles shown in FIG. 13. The automated nozzle adaptors and automated nozzles may have different sizes, designs and styles, to provide different product presentations, depending upon the product or the tastes of the customer. In an exemplary configuration, three vertical automated nozzle adaptors and/or automated nozzles extend downward from the dispensing and/or injecting apparatus, "Smart Door" component, and/or "I-Kit" component and are in fluid communication, either in serial or parallel with the source of one or more edible items to be dispensed and/or injected downward out through the automated nozzle adaptor and/or automated nozzles. For example, one automated nozzle adaptor and/or automated nozzle may be in communication with a source of vanilla yogurt, a second automated nozzle and/or automated nozzle adaptor may be in communication with a source of chocolate yogurt, and the third automated nozzle adaptor and/or automated nozzle may be in communication with both the chocolate and the vanilla yogurt to dispense and/or inject both simultaneously from the same automated nozzle adaptor and/or automated nozzle. In particular, the automated nozzle adaptor and/or automated nozzle may include a separation element, for example, an elongate sheet disposed within the interior of the automated nozzle adaptor and/or automated nozzle, which operates to split the interior of the automated nozzle adaptor and/or automated nozzle into two edible item pathways such that both edible items can be dispensed and/or injected from the same automated nozzle adaptor and/or automated nozzle. Each edible item pathway may be in communication with a particular edible item source and the automated nozzle adaptor and/or automated nozzle may be selectively switchable between sources of edible items depending on the selection by the user. The vertical orientation of the automated nozzle adaptor and/or automated nozzle may allow for the optional removal of the automated draw valve and/or the automated draw valve plunger, as gravity, air pressure, and/or type(s) of pressure may cooperate to release the edible product from the automated nozzle adaptor and/or automated nozzle without the need for mechanical force. The vertical orientation further allows for safety, as the automated nozzle adaptor and/or automated nozzle is in-line with the door and protruding as to cause an operator to inadvertently contact the automated nozzle adaptor and/or automated nozzle, and may further eliminate the need for a draw handle to manually push product out, as product may be dispensed and/or injected automatically without the need for manual operation of the draw valve.

Additionally, it is envisioned that some embodiments could include a "twin twist" option wherein two flavors would come from the same machine, "Smart Door" component, and/or "I-Kit" component with the integration of two selected flavors being dispensed and/or injected. Each flavor would be capable of injecting and dispensing; and, optionally, the two flavors could have a "twist" injection and dispensing operation through a separate third orifice. An additional product option is to allow the automated draw valve and/or automated draw valve plunger to act as a nozzle and/or a piercing object to create a cavity in the product and then the cavity is filled from a free-flow dispense and/or injection.

Continuing to refer to FIG. 13, the operator console of the dispensing and/or injecting apparatus, "Smart Door" component, and/or "I-Kit" component may affixed to the dispensing and/or injecting apparatus, "Smart Door" component, and/or "I-Kit" component or may be modular in that it can be removeably affixable to the dispensing and/or injecting apparatus, "Smart Door" component, and/or "I-Kit" component. The operator console may be Smartphone or tablet computer, such as an iPhone or iPad in communication with the Internet via wireless transmitter. As such, the dispensing and/or injecting apparatus, "Smart Door" component, and/or "I-Kit" component may be operated remotely through the Internet via a user. For example, the dispensing and/or injecting of edible product, injecting and/or dispensing of product with an edible or inedible item, cleaning, starting, stopping, collecting data about users and transmitted data may be accomplished through by the operator console in communication with the Internet. These operations may also be performed wirelessly, such as, but not limited to, through a mobile device or smartphone. The operator console may further operate to display the edible and/or inedible products on a touch-screen that is viewable in 2D, 3D, or 4D depending on the application. For example, a user may view an edible product on the operator console. The operator console may further be responsive to voice commands and may include voice recognition technology to dispense and/or inject a particular edible product in response to an oral command.

The operator console may further be in communication via the Internet with another Smartphone or tablet computer through a mobile application. For example, a user of the dispensing and/or injecting apparatus, "Smart Door" component, and/or "I-Kit" component may access the dispensing and/or injecting apparatus, "Smart Door" component, and/or "I-Kit" component through a mobile application, which may allow the user partial or full access to the dispensing and/or injecting apparatus, "Smart Door" component, and/or "I-Kit" component. Additionally, either through the mobile application or the operator interface, a user may access maintenance data, historical information about the dispensing and/or injecting apparatus' and/or "Smart Door" component's use, view nutritional information, such as calorie, or other health information about each edible item, identify and transmit service issues to a technician regarding potential service issues with the dispensing and/or injecting apparatus, "Smart Door" component, and/or "I-Kit" component, adjust the rate at which edible product is dispensed and/or injected from the dispensing and/or injecting apparatus, "Smart Door" component, and/or "I-Kit" component, adjust the temperature of the refrigeration system, or any other function or operation of the dispensing and/or injecting apparatus, "Smart Door" component, and/or "I-Kit" component. Moreover, either through the mobile application or the operator interface directly, a user may visually monitor the dispensing and/or injecting system through an optional surveillance system which would store and record video, so that events can be monitored either in real-time or after the fact. The surveillance video typically may integrate and network with other camera and computer systems, like the surveillance security system or POS system. As previously described, the operator interface may further be in communication with a GPS system operable to locate each and every dispensing and/or injecting system. The mobile application and/or operator interface may further be in communication with a kill-switch on the dispensing and/or injecting apparatus, "Smart Door" component, and/or "I-Kit" component, which may render the dispensing and/or injecting apparatus, "Smart Door" component, and/or "I-Kit" component inoperable, for example, if the dispensing and/or injecting apparatus, "Smart Door" component, and/or "I-Kit" component is stolen.

Figure 14:
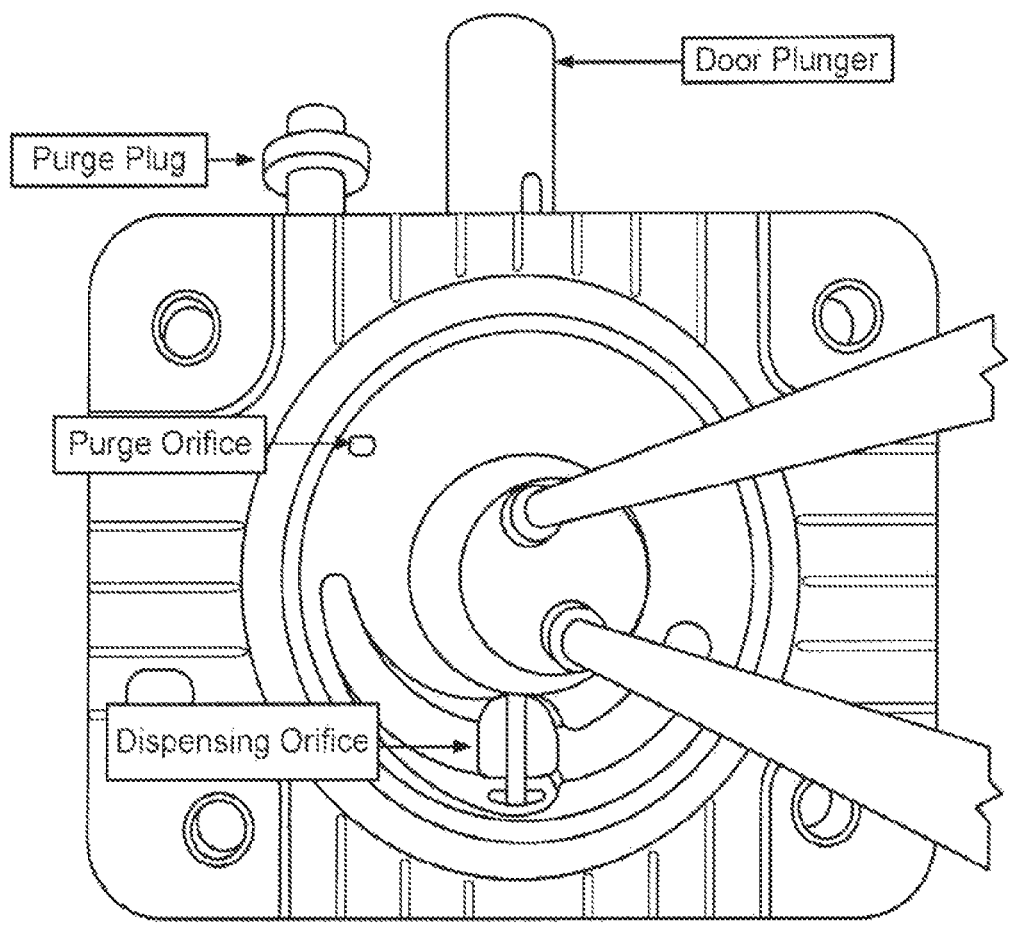
FIG. 14 illustrates an inside view of the door of the dispensing apparatus shown in FIG. 13.

Referring now to FIG. 14, the dispensing and/or injecting system of the machine, modular door, and "I-Kit" component may include a door operably connected to the vertical automated nozzle adaptor and/or automated nozzle. The inside panel of the door and/or interior and/or exterior of the walls and/or machines may include an automated draw valve, an automated draw valve plunger and/or an automated guillotine valve, inside of the automated nozzle adaptor and/or automated nozzle, an automated guillotine valve may be applied to push edible product out through the automated nozzle adaptor and/or automated nozzle, which operate to push edible product out through a dispensing and/or injecting orifice which is in fluid communication with the automated nozzle adaptor and/or automated nozzle. The dispensing and/or injecting orifice may include a septum operable to separate the flow of edible product into two flows of edible product. An optional automated guillotine valve may be included within the door and proximate the dispensing and/or injecting automated orifice. Optionally, the automated orifice and/or automated guillotine valve, may or may not include an automated nozzle adaptor and/or automated nozzle, are located on the front side of the door rather than the bottom of the door. The orifice may or may not include an automated nozzle and/or automated nozzle adaptor. The automated guillotine valve may be operable to close off the orifice to the flow of edible product when the automated door and/or automated orifice are opened to prevent edible product from leaking out of the dispensing and/or injecting system. The automated guillotine valve, automated passageway and/or automated orifice valves may be automatically operated by the electrical system to open when the door is closed and close when the door is open. The automated guillotine valve, automated passageway, and/or automated orifice may further operate as check valves by stopping the flow of product in response to a change in pressure(s) when the automated door, automated passageways, automated valve and/or automated orifice are opened. Additionally, an orifice shut off(s) can be used to control the flow of the product(s). Similarly, a "guillotine" style automated valve can be controlled through the operator interface and/or mobile devices, and/or manually.

A purge orifice may be fluidly connected to an automated purge plug which allows air to be released from the dispensing and/or injecting system. In other embodiment no purge plug is included and air may be released from the system automatically in response to an increase in pressure(s) in the system. For example, the valve may be bled excess air in the dispensing and/or injecting system when the control unit detects an increase in air pressure and/or pressure(s) in the system and/or to adjust the consistency of the dispensed and/or injected product which is part air.

Figure 15:
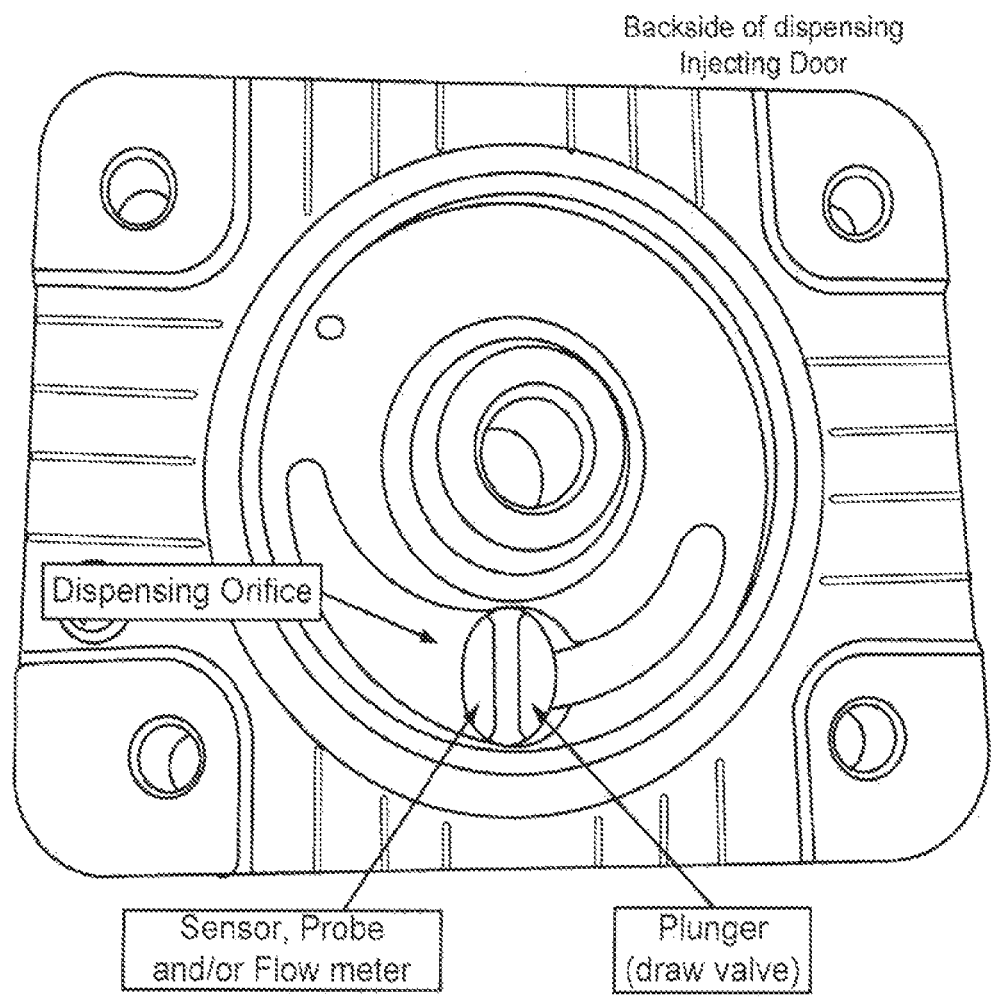
FIG. 15 illustrates the "Smart Door" component of the present disclosure.
Figure 23:
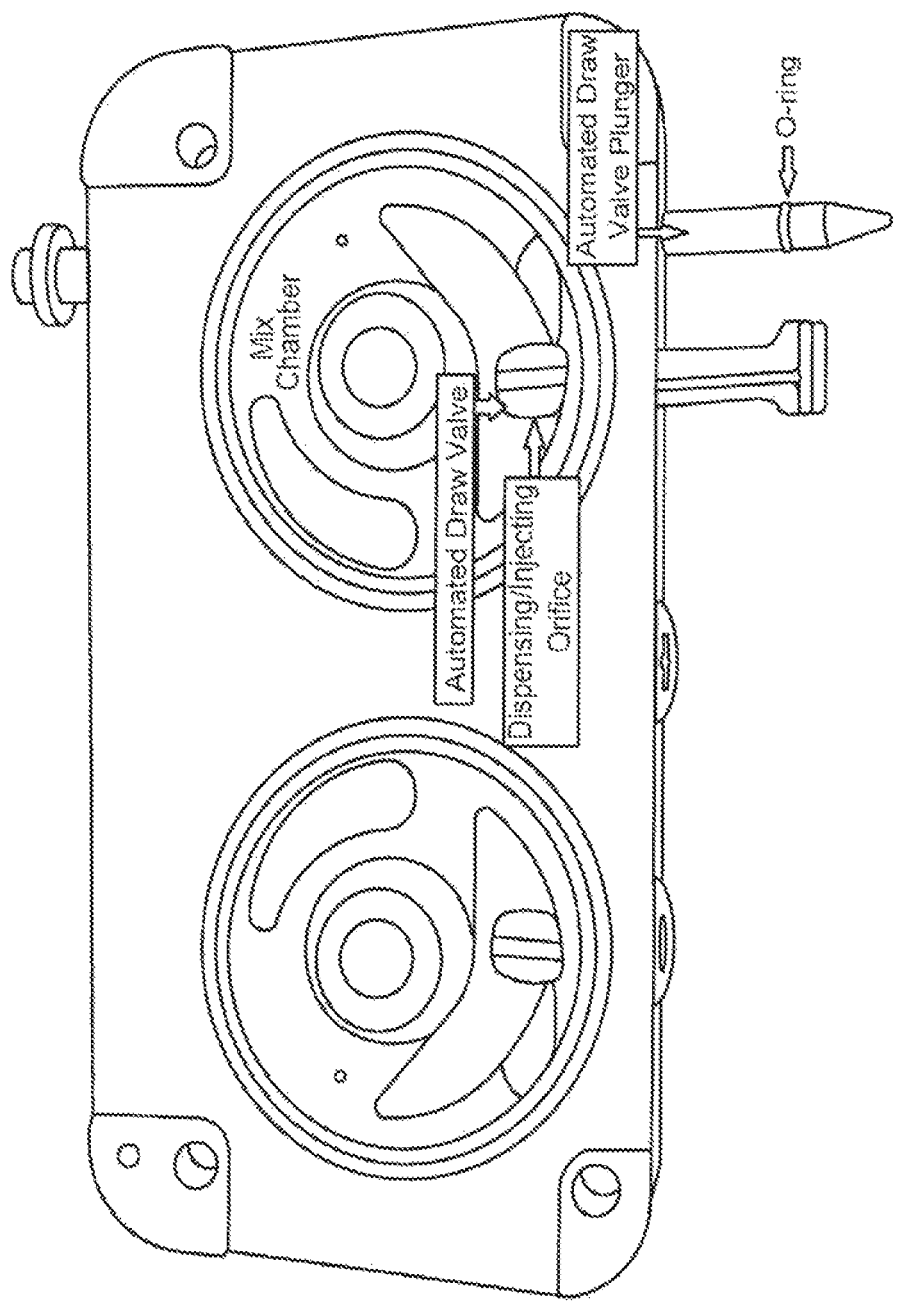
FIG. 23 illustrates a further embodiment of the "Smart Door" component.

The door of FIGS. 14, 15 and 23 incorporates intelligent or "Smart Door" component and/or "I-Kit" component modular design" component technology wherein the modular door or "I-Kit" component is in communication with the programmable logic controller. This is to achieve more precise control of the flow of the product that passes through the dispensing and/or injecting orifice and to achieve more accurate portion control injecting and dispensing as well as metering of the flowable product(s). In particular, the "Smart Door" and/or "I-Kit" component component technology includes a sensor, probe and/or flow meter that is in communication with the PLC and the operator interface. The flowable product is measured or metered by quantifying the product mass that passes through the dispensing and/or injecting orifice. For example, the operator can select the pre-determined amount either by selecting "small" or "4 oz." on the visual display. Likewise, the operator can select a flowable edible product via a nutritional attribute, such as "dispense 100 calories". The probe, sensor and/or flow meter can also act as a thermometer or viscometer and measure the flow rate of the flowable product. Further, among other benefits, controlling the flow of the product(s) through the automated passageway, and/or automated dispensing and/or injecting orifice(s) will allow for more flexibility, versatility with sizes and styles of automated nozzles and/or automated nozzle adaptors, and/or automated draw valves, automated draw plungers, automated guillotine draw valves consistent flowable product, accurate dispensing and injection, a cleaner machine, modular door, and/or "I-Kit" and more command of how the machine, modular door and/or "I-Kit" operates.

The technology of the modular door and "I-Kit" component of FIGS. 14 and 15 allows for the metering of the flow of the product(s) at the dispensing and/or injecting automated passageways and/or automated orifice(s) in communication with the programmable logic controller (which may receive customer requests or other information, including desired portion size, via an operator interface, such as a touch screen, or even wirelessly) before the selection is made, during the selection, and/or after the selection is made, to automatically measure the amount of flowable product for precise portion control (typically on a volume basis, but also possibly on a time basis, such as dispensing or injecting for two seconds before closing the dispensing and/or injecting orifice). Further, this provides an automated adjustable dispensing and/or injecting automated passageways and/or automated orifice(s), whereby the opening (s) of the automated passageways and/or automated orifices can be automatically adjusted to any size diameter, and/or other characteristics (such as length) including fully opened or fully closed. Additionally, interchangeable automated nozzles, automated nozzle adaptors, automated nozzle plungers, automated draw valve, and/or automated draw valve plungers, automated guillotine valve (of different diameters and other characteristics) and automated draw valves, automated guillotine valve and/or automated draw valve plungers can be accommodated and are designed to adapt to one or many doors, passageways and/or orifice sizes. The automated nozzle adaptor and/or nozzles and automated draw valves and/or automated draw valve plungers, automated guillotine valve have a broad range of functions, angles, movements, sizes, materials, styles, shapes and designs, as well as method of interchangeable attachment and detachment. Additionally, the automated nozzles and/or automated nozzle adaptors may be used with or without an automated draw valve, automated guillotine valve and/or an automated draw valve plunger.

Further, the door and "I-Kit" component of FIGS. 14 and 15 provides for a sleek novel door design that may eliminate a draw handle, resulting in less plastic and material. As previously described, the automated guillotine style shut-off valves, which are in communication with the programmable logic controller, pauses, starts and stops the flow of flowable product at the dispensing and/or injecting orifice(s). The automated draw valve and/or automated draw valve plungers are designed to extend through the passageways, orifices, nozzle adaptor and/or nozzle to create a seal and eliminate the drip that is currently a nuisance and bacteria haven on many prior art devices. These automated draw valve and/or automated draw valve plungers expunge excess flowable product(s), creating a cleaner and more sanitary machine, "Smart Door" component, and/or "I-Kit" component.

The automated passageways, automated orifices, automated nozzles and/or automated nozzle adaptors, automated draw valve, automated guillotine valve and/or automated draw valve plungers may or may not be a fixed apparatus, "Smart Door" component, and/or "I-Kit" component, whereby the cleaning and sanitizing of the automated passageways, automated orifices, automated nozzles, automated nozzle adaptors, automated draw valve, automated guillotine valve and/or automated draw valve plungers may involve one or more steps. However, with the increase of allergen awareness and for bacteriological concerns and to further limit or eliminate the steps of cleaning and sanitizing, the automated nozzle adaptor and/or automated nozzle, and an automated draw valve may be a single/multi use removable/disposable automated nozzle, automated nozzle adaptor and/or automated draw valves and/or plunger. Among other advantages of a single or multiple use removable or disposable automated nozzle adaptors, automated nozzles, automated draw valve plungers may be to reduce or eliminate cross-contact for allergens and to further reduce or eliminate bacterial growth that could potentially occur when an item is placed on the automated nozzle, automated nozzle adaptor and/or automated draw valve and/or automated draw valve plunger for injecting and/or dispensing. The single, multi-use, removable and/or disposable automated passageways, automated orifice, automated nozzle adaptor, automated nozzle, automated draw valve, and/or automated draw valve plunger may pertain to the actual automated nozzle, automated nozzle adaptor, automated draw valve and/or automated draw valve plunger or act as a cover on an automated nozzle adaptor and/or automated nozzle that may or may not be a fixed apparatus to the door and/or is actually molded to part of the door itself. Automated passageway, automated orifice, automated nozzles, automated nozzle adapters, automated draw valves, automated guillotine valve and/or automated draw valve plungers may be used in conjunction with one and other, for example, when the automated nozzle is a draw valve. However, they may also be used separately, such as an automated passageway, automated orifice, automated guillotine valve, automated nozzle and/or automated nozzle adaptors with no automated draw valve (see FIG. 20) or an automated draw valve plunger with no automated nozzle. Automated passageways, automated orifices, automated guillotine valves, automated nozzles, automated nozzle adapters, automated draw valves, and/or automated draw valve plungers can be made from a variety of different materials including, but limited to, stainless steel, metals, plastics, paper, cardboard and other various disposable and/or reusable materials. Automated passageways, automated orifices, automated guillotine valve, automated nozzles, automated nozzle adapters, automated draw valves, and/or automated draw valve plungers can even be made of edible or eco-friendly materials. Automated passageways, automated orifices, automated guillotine valves, automated nozzles, automated nozzle adapters, automated draw valves, and/or automated draw valve plungers can perform other functions aside from dispensing and injecting. For instance, automated passageways, automated orifices, automated guillotine valves, automated nozzles, automated nozzle adapters, automated draw valves, and/or automated draw valve plungers, alone or in combination, can rotate, spin, and/or move in other various ways and be used as a mixer and/or blender to mix-in various toppings like cookies to create different products. Further, the automated passageways, automated orifices, automated guillotine valves, automated nozzles, automated nozzle adapters, automated draw valves, and/or automated draw valve plungers can be used to makes shakes and blend in flavors, toppings, and/or sauces for different types of beverages. Finally, in order to eliminate extra parts for assembly/disassembly and to further reduce costs for the manufacturing/fabrication of extra parts, an injecting/dispensing automated passageways, automated orifices, automated guillotine valves, automated nozzles, automated nozzle adapters, automated draw valves, automated guillotine valve and/or automated draw valve plungers may be part of the interior and/or exterior of the actual door design and molded as part of the interior and/or exterior of the door. The automated passageways, automated orifices, automated guillotine valves, automated nozzles, automated nozzle adapters, automated draw valves, automated guillotine valve and/or automated draw valve plungers may or may not protrude from the door and could be part of the interior and/or exterior part of the dispensing and/or injecting orifice.

It is envisioned that some embodiments of the apparatus, "Smart Door" component, and/or "I-Kit" component could retain the manual draw handle or lever, if desired. Additionally, the apparatus, "Smart Door" component, and/or "I-Kit" component provides the ability to adjust for "overrun"—the incorporation of air within the flowable edible product. In the prior art, this is typically achieved through changing physical devices that dictate the air-to-product ratio. However, the present disclosure allows the operator to select the desired overrun without having to change-out the physical devices.

Figure 16:
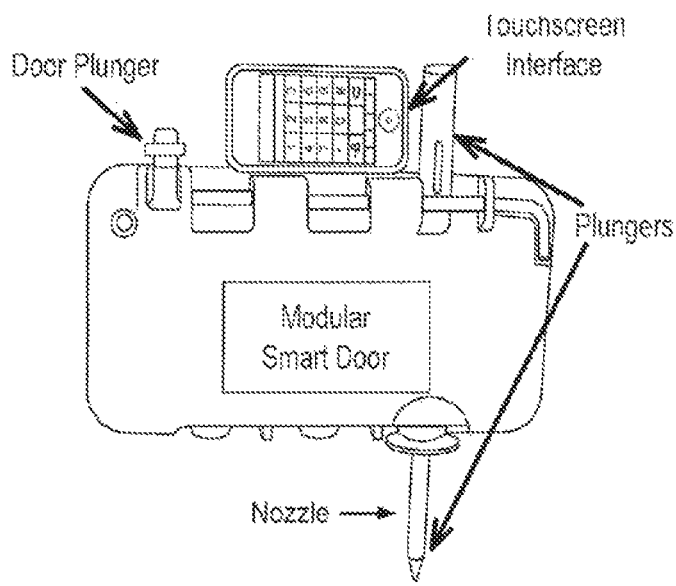
FIG. 16 illustrates a modular embodiment of the "Smart Door" component of the present disclosure.
Figure 17:
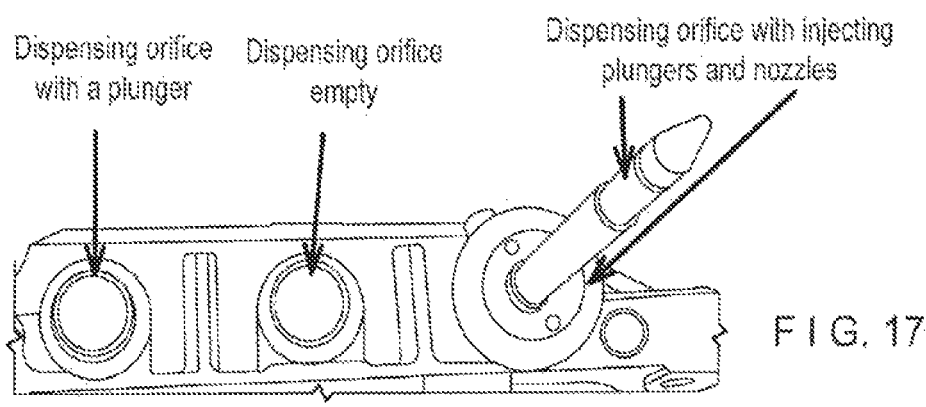
FIG. 17 illustrates a plunger configuration of a modular embodiment of the "Smart Door" component of the present disclosure.
Figure 18:
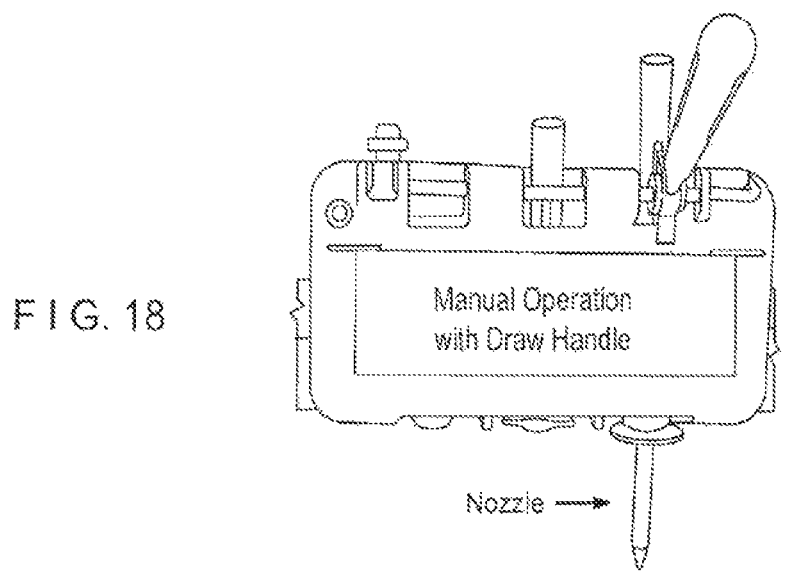
FIG. 18 illustrates a configuration of a modular embodiment of the "Smart Door" component including a draw handle for manual operation.

FIGS. 16, 17 and 18 illustrate a further embodiment of the "Smart Door" component (and/or "I-Kit" component) component implemented as modular embodiments. The modular characteristic refers to the attachable/detachable aspect of the door, "I-Kit" touch screen interface and/or mobile devices. The operation between the door, "I-Kit" and the interface is via a wired and/or wireless connection whereby communication can be through a remote control, internet connection and/or application on a smart phone, tablet or similar device. Further, the interface may be used to control, display or generate advertising and promotional messages and/or images and may likewise be used to display nutritional or similar information. Moreover, the door and/or "I-Kit" component as components may have facades and/or parts that are interchangeable.

The modular characteristic of the modular door, "I-Kit" component, touch screen interface and/or mobile devices enables all components to be completely independent from the host machine and/or mix chamber, such as barrel, container (such as a soft serve or other similar machine), thereby allowing virtually any machine and/or mix chamber, such as barrel, container, to be equipped with the "Smart Door" and/or "I-Kit" component modular design component and touch screen operation thereby typically eliminating the laborious manual operation of such equipment. The modular door, "I-Kit" component, and the interface are interchangeable components, whereby one can be updated or replaced without having to replace the other.

The modular "Smart Door" component and/or "I-Kit" component and/or touch screen interface can be equipped to many different machines and/or mix chambers, etc., typically without altering or interfering with the base host machine's and/or mix chamber's mechanics, functionality, wiring, refrigeration systems, dispensing and/or injecting systems and overall footprint.

Figure 19:
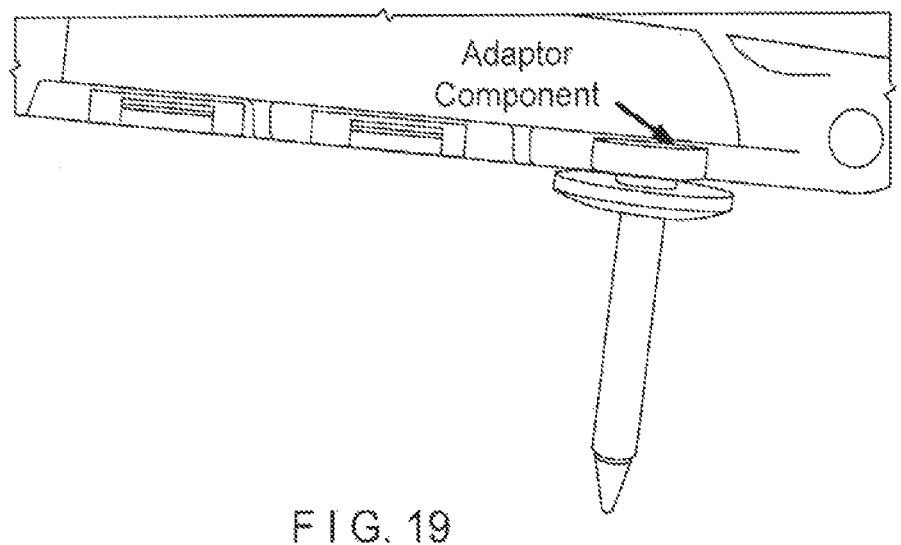
FIG. 19 illustrates a configuration of an adapter component.
Figure 20:
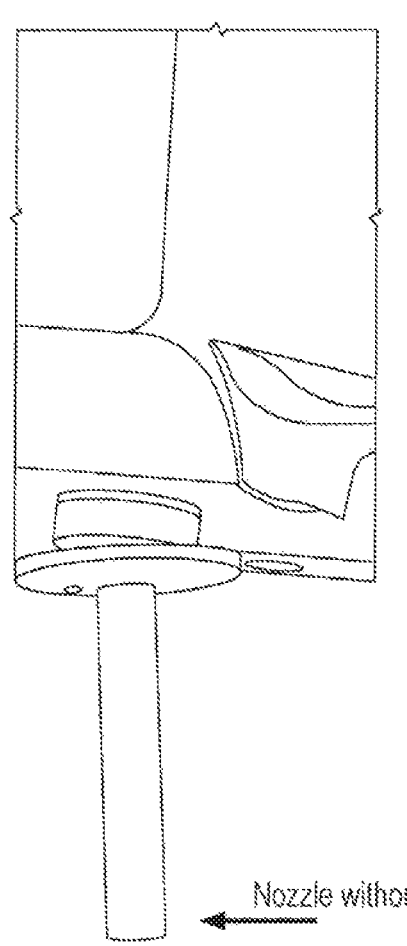
FIG. 20 illustrates a configuration of a nozzle without a plunger.
Figure 21:
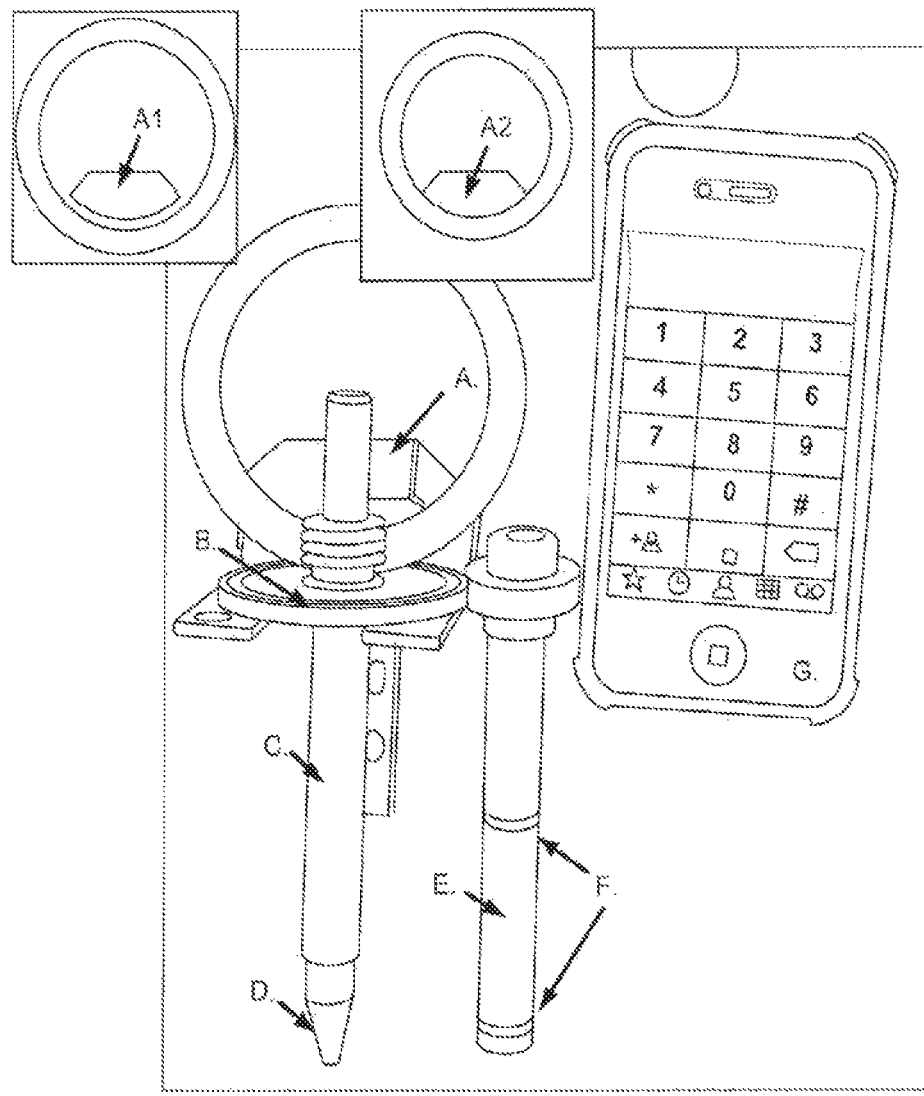
FIG. 21 illustrates the "I-Kit" component configuration.

The modular door and/or "I-Kit" component may have ancillary interchangeable components that may be single use (i.e., disposable) or multiple use and may be affixed to the modular door and/or "I-Kit" component, and subsequently be removable therefrom. Moreover, the modular door and/or "I-Kit" component(s) may be designed wherein the automated passageways, automated orifices, automated nozzles, automated nozzle adapters, automated draw valves, automated draw valve plungers, and/or guillotine valve are molded as part of the door or "I-Kit" component. The interchangeable components may be implemented with an adaptor component such as shown in FIG. 19. The automated passageway, automated orifice, automated guillotine valve, automated nozzle adaptor(s), automated nozzle, automated draw valve, and automated draw valve plunger may be molded as part of the modular door or "I-Kit" component and/or as a separate component(s). In the absence of a fixture, the automated passageway, automated orifice, automated nozzle adaptor and/or automated guillotine valve(s) may be implemented as an injecting or dispensing orifice.

Moreover, the automated passageway, automated orifice, automated draw valve, the automated draw valve plunger, the automated nozzle, the automated nozzle adaptor, and the automated guillotine valve, all have the ability to rotate independently or collectively, and they all have the ability to be motorized independently or collectively.

The operation of the automated guillotine valve and/or design valve may operate and/or be controlled independently of the machine, modular door, "I-Kit" component, automated passageways, automated orifices, automated draw valve, automated draw valve plunger, automated nozzle adaptor, automated nozzle, automated enhanced flavor system, and/or all systems and components. Automated guillotine valve and/or design valve may be temperature controlled, heated and/or refrigerated, as appropriate for the optimal functioning of the device. The automated guillotine valve and/or design valve may be further equipped with a metering system to quantify the product dispensed or injected from the modular door and/or "I-Kit". Data regarding the quantified or metered product may be displayed or otherwise indicated on the interface and may include such data as volume, measurements, nutritional characteristics, image, number, text and/or other visual and/or audible indicators.

The automated guillotine valve and/or design valves are designed to control the flow of product(s) (flowable) to the dispensing and/or injecting orifices for the purpose of dispensing and/or injecting products. The automated guillotine valves and/or design valves functions are to start, stop, pause, rotate, hold, and continue the flow of products (flowable) from the machine, modular door, "I-Kit" component, mix chamber, passageway and/or orifice so the automated draw valve, automated draw valve plunger, or any type of valve, automated nozzle adaptor, automated nozzle, automated enhanced flavor system, automated passageway, automated orifices or any system can be interchanged, replaced, removed, and/or repaired, independently of the machine, modular door, "I-Kit" component, touch screen interface or mobile devices. The automated guillotine valve can also act independently as the automated passageway and/or automated orifice by itself. The automated guillotine valve can also act as an adaptor with all the functions of an adapter.

The operation of the automated passageway and/or design valve may operate and/or be controlled independently of the machine, modular door, "I-Kit" component, automated passageways, automated orifices, automated draw valve, automated draw valve plunger, automated nozzle adaptor, automated nozzle, automated enhanced flavor system, and/or all systems and components. Automated guillotine valve and/or design valve may be temperature controlled, heated and/or refrigerated, as appropriate for the optimal functioning of the device. The automated guillotine valve and/or design valve may be further equipped with a metering system to quantify the product dispensed or injected from the modular door and/or "I-Kit". Data regarding the quantified or metered product may be displayed or otherwise indicated on the interface and may include such data as volume, measurements, nutritional characteristics, image, number, text and/or other visual and/or audible indicators.

The automated passageway guillotine valve and/or design valves are designed to control the flow of product(s) (flowable) to the dispensing and/or injecting orifices for the purpose of dispensing and/or injecting products. The automated guillotine valves and/or design valves functions are to start, stop, pause, rotate, hold, and continue the flow of products (flowable) from the machine, modular door, "I-Kit" component, mix chamber, passageway and/or orifice so the automated draw valve, automated draw valve plunger, or any type of valve, automated nozzle adaptor, automated nozzle, automated enhanced flavor system, automated passageway, automated orifices or any system can be interchanged, replaced, removed, and/or repaired, independently of the machine, modular door, "I-Kit" component, touch screen interface or mobile devices. The automated guillotine valve can also act independently as the automated passageway and/or automated orifice by itself. The automated guillotine valve can also act as an adaptor, with all the functions of an adaptor.

The operation of the automated orifice and/or design valve may operate and/or be controlled independently of the machine, modular door, "I-Kit" component, automated passageways, automated orifices, automated draw valve, automated draw valve plunger, automated nozzle adaptor, automated nozzle, automated enhanced flavor system, and/or all systems and components. Automated guillotine valve and/or design valve may be temperature controlled, heated and/or refrigerated, as appropriate for the optimal functioning of the device. The automated guillotine valve and/or design valve may be further equipped with a metering system to quantify the product dispensed or injected from the modular door and/or "I-Kit". Data regarding the quantified or metered product may be displayed or otherwise indicated on the interface and may include such data as volume, measurements, nutritional characteristics, image, number, text and/or other visual and/or audible indicators.

The automated orifice guillotine valve and/or design valves are designed to control the flow of product(s) (flowable) to the dispensing and/or injecting orifices for the purpose of dispensing and/or injecting products. The automated guillotine valves and/or design valves functions are to start, stop, pause, rotate, hold, and continue the flow of products (flowable) from the machine, modular door, "I-Kit" component, mix chamber, passageway and/or orifice so the automated draw valve, automated draw valve plunger, or any type of valve, automated nozzle adaptor, automated nozzle, automated enhanced flavor system, automated passageway, automated orifices or any system can be interchanged, replaced, removed, and/or repaired, independently of the machine, modular door, "I-Kit" component, touch screen interface or mobile devices. The automated guillotine valve can also act independently as the automated passageway and/or automated orifice by itself. The automated guillotine valve can also act as an adaptor, with all the functions of an adaptor.

The interchangeable components may or may not be automated which include injecting/dispensing nozzles which may be single or multi-head. The interchangeable automated nozzles may include different characteristics, such as different shapes, angles, sizes, designs, surfaces, functions, O-rings, seals, gaskets, and types thereby enabling the apparatus, the machine, the modular door, and/or "I-Kit" component to accommodate a wide range of products. Similarly, the interchangeable components may be made from materials such as, but not limited to, stainless steel, metals, plastics, papers and/or other polymers. Further, the apparatus, machine, the modular door, and/or "I-Kit" component can implement a wide range of injecting and/or dispensing methods.

The interchangeable components may further include an injecting/dispensing automated draw valve, and automated draw valve plungers, which may be single head or multi-head. The automated draw valve(s) may have many types of movements, such as up, down, pause, rotate, stop, open, close, sideways, and more. The automated draw valve and/or automated draw valve plunger can act as an orifice with an opening and/or passageway through any part of the automated draw valves and automatic draw valve plunger so product can pass through and then after the product goes through, the automated draw valve and/or automated draw valve plunger may or may not rotate, go up, and then go down to act as the plunger. The automated draw valve or automated draw valve plunger can act as a meter or be part of a metering system, a temperature control system, and/or other systems of the machine, modular door, and/or "I-Kit" component. The automated draw valve and/or automated draw valve plunger may come in one or more sections that are interchangeable in the same or different size, shape, design, or materials. The automated draw valves and/or automated draw valve plunger are used to plunge the ice cream or similar product out of the orifice, automated nozzle adaptor and/or automated nozzle, and are to extend through the orifice, automated nozzle adaptor, and/or automated nozzle, so the automated valve tip and/or automated draw valve plunger tip are exposed through the automated orifice, automated nozzle adaptor, and/or automated nozzle to create a seal, "Drip Proof" system. Also, O-rings, seals, and/or gaskets can be used in the process, thereby eliminating excess product and "drip"—a common deficiency of some soft serve equipment. The interchangeable automated draw valve and/or automated draw valve plunger are typically available in different sizes, shapes, styles, designs, types, and other characteristics.

The modular door and/or "I-Kit" component may operate with or without an automated draw valve, an automated draw valve plunger, an automated nozzle adaptor, an automated nozzle, and/or an automated guillotine valve. Even if an automated nozzle adaptor, automated nozzle, and/or automated guillotine valve are provided, the modular door or "I-Kit" component may or may not have an automated draw valve. In the absence of the automated nozzle, automated nozzle adaptor, automated guillotine valve, an automated draw valve and/or an automated draw valve plunger, the automated guillotine valve, the automated passageway, the automated orifice, the automated nozzle adaptor and/or automated nozzle becomes a dispensing/injecting orifice via an extended spout. Even if an automated draw valve is provided, the modular door or "I-Kit" component may or may not have a nozzle adaptor and/or nozzle. In the absence of the automated nozzle adaptor and/or automated nozzle, the automated draw valve and/or automated guillotine valve and/or design valve become a dispensing orifice. In the absence of the automated nozzle adaptor, automated nozzle and automated draw valve, the automated draw valve plunger, the automated guillotine valve and/or design becomes a dispensing orifice. To accommodate the numerous options of different sizes and shapes, an automated draw valve pocket, automated orifice, automated passageway may also be used in conjunction with the automated draw valve, automated draw valve plunger, automated nozzle adaptor, automated nozzle, and/or automated guillotine valve to facilitate the reduction and/or enlargement of a dispensing and/or injecting orifice, automated nozzle adaptor, automated nozzle, automated guillotine valve, and/or other types of automated valves.

The modular door and/or "I-Kit" component may also be designed with a dispensing/injecting orifice(s) located on the front of the machine door, modular door, and/or I-kit may or may not have passageway to the automated guillotine valve, either in addition to and/or independent of the automated vertical nozzles, automated vertical nozzle adaptor, and/or orifices. All dispensing/injecting orifices, and/or passageways, including automated guillotine valve orifice, automated nozzle adaptors, automated nozzle orifices, may be from a range of materials, sizes, shapes and colors. The (automated) orifices may be further adjustable either in conjunction with the (automated) passageways, automated nozzle adaptor, automated nozzles, automated draw valve, automated draw valve plunger, and/or automated guillotine valve or independent of the automated passageways, automated nozzle adaptor, automated nozzles, automated draw valves, automated draw valve plunger, and/or automated guillotine valve.

The operation of the automated draw valve and/or automated draw valve plunger may be controlled independently of the modular door and in communication with the touch screen interface and/or mobile devices. Automated nozzle adaptors, automated nozzles, automated draw valves, automated draw valve plungers, automated guillotine valve, automated orifice, automated passageways, and/or automated draw plunger pocket may be temperature controlled, heated and/or refrigerated as appropriate for the optimal functioning of the device and/or temperature. Automated purge draw valves are further in communication with the interface and other components. The temperature control further pertains to the draw valve pocket as well as the interior and exterior of the door.

A further optional product enhancement is that the interior or exterior of the modular door and/or "I-Kit" component may also have a flavor enhancement system (using interchangeable cartridges or similar configurations) whereby a variety of different flavors, toppings, sauces, mix-ins, nutritional supplements or other additives may be combined with a base flavor, outside its use, and/or products, meats, such as hamburger, during the product dispensing or injecting step of the machine, "Smart Door" component, and/or "I-Kit" component. The desired additive would be selected via the interface and/or mobile device for dispensing or injecting. The flavor enhancement system and/or temperature controlled liquid line and/or temperature controlled liquid reservoir may be combined together, either independently or collectively. Flavor enhancement system and the reservoir tanks may be temperature controlled. Whereby its use may have various applications outside of its intended use.

Further with regard to the portion control system, the modular door and "I-Kit" component may be further equipped with a metering system to quantify the product dispensed or injected from the modular door and/or "I-Kit" component. The metering system may be located on various components of the modular door and/or "I-Kit" component including, but not limited to, the interior and/or exterior of the modular door and/or "I-Kit" component, automated orifices, automated passageways, automated draw valves, automated draw valve plungers, automated nozzle adaptors, automated nozzles and/or automated guillotine valves. Data regarding the quantified or metered product(s) may be displayed and/or otherwise indicated on the interface and/or mobile device(s) and/or components and may include such data as flow rate, volume measurement, nutritional characteristic, image, number, text and/or other visual and/or audible indicators. The metering system and/or meter may be an independent device whereby its use may have various applications outside of its intended use with the modular door and/or "I-Kit" component systems.

The modular door and/or "I-Kit" component may also have a manual back-up in case there are technical issues with the interface and/or communication signal. The modular door and/or "I-Kit" component may be able to dispense and/or inject via a manual draw handle (or, similarly, a manual foot pedal) which is easily connected thereto. Various probes and/or sensors may be provided in various locations within the modular door and/or "I-Kit" component, passageways, orifices, meters, automated draw valves, automated draw valve plungers, nozzle adaptors, nozzles and/or automated guillotine valve. The functions of the probes and sensors may range from temperature monitoring, measuring bacteria levels, allergens, measuring viscosity, recording the type(s) of product(s) or other similar functions.

The interface, machine, modular door, and/or "I-Kit" component may be able to accept payment via a credit card and/or mobile application.

In summary, the apparatus modular door and/or "I-Kit" component is intended to have fully automated cleaning, sanitizing and/or start-up cycles and/or systems, whereby the operator can access the machine door and/or "I-Kit" component remotely through an internet, mobile application or similar connection, thereby resulting in significant cost savings with respect to the laborious process of these tasks.

The automated dispensing and/or injecting system of the machine, modular door, and/or "I-Kit" component may further be powered by batteries of all types and/or sizes, renewable energy sources, directly and/or indirectly. For example, as previously described, one or more solar collectors may be included on the dispensing and/or injecting apparatus, modular door, and/or "I-Kit" component and edible dispensing and/or injecting systems to power the various components including, but not limited to, the refrigeration system, the operator console, the mixing system, and the edible product dispensing and injecting system. For example, one or more of the dispensing and/or injecting systems including solar collectors may be provided in an indoor or outdoor establishment such that plugs and traditional power sources are not needed and which further allows the dispensing and/or injecting systems to be readily increased in numbers or readily moved to different locations.

Smart portable automated displays are lit visually and/or digitally and are used for advertising, price display, sales reporting, nutritional information, crossing information, video images, video communication, data reporting, order, storage system, cloud storage, ordering and/or refilling, display temperatures of products and displays, voice controls and commands, and video recording. Smart tag displays are attachable and/or detachable, portable displays powered by solar energy, battery, electric, direct and indirect lighting, LED lighting, sources of energy. Smart portable displays can be placed anywhere on the apparatus, "Smart Door" component, and/or "I-Kit" component, and can be displayed on mobile devices and/or interfaces. Whereby its use may have various applications outside of its intended use.

Hollowed-out compartment can be located on the machine, modular door and/or "I-Kit" component, and/or modular door and/or "I-Kit" component components. A hollowed-out compartment can be automated, watertight, incorporate systems of gears, lights, plugs, wires, electrical, electronics, mounting, components, brackets, sockets, codings, insulation, and more. The hollowed-out compartment can be temperature controlled, able to send and receive signals for the housing of components, such as automated passageways, automated orifices, automated draw valves, automated draw valve plungers, automated nozzle adaptors, automated nozzles, automated guillotine valve, and/or any component of the automated dispensing and/or injecting systems. All features controlled by touch screen interface and/or mobile devices, wired or wirelessly.

Automated electrical contacts are contacts mounted and/or placed on locations of the interior or exterior of the apparatus, modular door, and/or "I-Kit" component and/or components to pass electrical currents.

Automated digital readings of all systems of the machine, modular door, and/or "I-Kit" component such as: the low mix level temperatures, product measurements in the mix chamber and/or the product reservoir, and/or product conversion of flavors, toppings, sauces, ice cream, yogurt, number of dispenses and/or injections (shots) of products in gallons, ounces, grams the system(s) of the machine, "Smart Door" component, and/or "I-Kit" component are displayed on the machine, "Smart Door" component, and/or "I-Kit" component.

Automated blades, mixing blades, beater blades, and/or impellers come in different designs, sizes, shapes, and/or material, depending on the machine, modular door, and/or "I-Kit" component system is needed to adjust to the machine, modular door, "I-Kit," and/or mixing chambers and/or products being mixed such as: sauces, toppings, syrups, fruits, oats, barley, flavors; liquid, dry, and/or flowable products (frozen flowable products) hot or cold products, that are being blended for dispensing and/or injecting. Automated blades, mixing blades, beater blades, and/or impellers may blend and/or mix at different speeds and/or flow rate and could be tied into one and/or all systems of the machine, modular door and/or "I-Kit" component, such as flavoring and/or metering system. Automated blades are interchangeable, attachable, detachable, or affixed and are able to send and/or receive signals to and from all injecting and/or dispensing systems through the touch screen interface and/or mobile devices, either wired and/or wirelessly.

Automated product timers have the ability to set the amount of time in seconds, minutes and/or hours called for in all settings for all dispensing, injecting and/or product of the apparatus, "Smart Door" component, and/or "I-Kit" component systems, either through touch screen interface and/or mobile devices, wired and/or wirelessly.

Automated idle timers are able to set the time for the dispensing and/or injecting components and/or systems to turn on and/or pause if there is little and/or no activity on the dispensing and/or injecting system and/or systems and/or the machine, modular door, and/or "I-Kit" systems.

Automated cycle timers have the ability to set cycles and/or adjust cycles in all systems and/or the machine, modular door, and/or "I-Kit" systems, individually or collectively.

Automated conveyer belt systems, in which one or more machines, modular doors, or "I-Kit" component systems or in a combination of the systems of the machine, modular door, and/or "I-Kit" component are in a line consecutively, featuring a conveyer belt system running under the dispensing and/or injecting systems of the machine, modular door, and/or "I-Kit" component. The conveyer belt system will index, stop, and/or pause to lift each product(s) under the automated single or multi orifice(s) and/or automated single or multi nozzle(s) to either dispense or inject the product(s). It can be operated through the interface or touch screen device, wired or wirelessly.

Automated combo dispensing and/or injecting refers to having two or more products, flavors, toppings and/or sauces combined and/or integrated from the one mix chamber and with one or more orifice(s) from one mix chamber for dispensing and/or injecting of products. Each orifice can operate independently and/or collectively with or without the automated draw valve plungers, automated nozzle adaptors, automated nozzles, automated draw valve, automated guillotine valve, and/or other components. Combo dispensing and/or injecting operates on all machine, modular door, and/or "I-Kit" component systems and through touch screen interface and/or mobile devices wired and/or wirelessly.

Automated forced engineering systems are developed for automated portion controlled dispensing and/or injecting machines and/or systems that are not equipped with pressure and operate on gravity as the force.

Automated forced engineered systems may be equipped on machines, modular door systems, and "I-Kit" component systems whereby different types of force(s) propel the mass of flowable products, mixed products, flavors, and/or products in the mix chamber are to the dispensing and/or injecting orifice. There are a variety of forces including, but not limited to, any force of nature including gravity, pressure, air, electric, magnetic, balance, unbalanced, contact, back electromotive free, buoyancy, any unit of normal force, tensile, or any physical device(s). Force engineered product(s) system may include automated blades, mixing blades, beater blades, and impellers. As product is needed, the touch screen interface and/or mobile device(s) signals the force and/or mass to move in a direction for dispensing and/or injecting of products.

Multi windows are screens of electronic visual display that the user can control the many features and/or functions that are stored in the touch screen interface and/or mobile device(s) and operated through the portion controlled dispensing and/or injecting system and/or modular portable portion controlled dispensing and/or injecting system of the machine, modular door, and/or "I-Kit" component.

Hibernation in computing, dispensing and/or injecting is powering down. Upon hibernation the computer, and dispensing and/or injecting systems saves the contents of its memory. Upon resumption, the computer and dispensing and/or injecting systems, are exactly as they were before entering hibernation.

Automated temperature controlled liquid line and/or automated temperature controlled liquid reservoir tank is intended to introduce hot, warm, cold and/or temperature controlled liquid(s) to the machine, modular door, "I-Kit" component system, and/or mix chambers of the system to either reconstitute dehydrated mix products, mix products, dry mix products, oats, liquid eggs, liquid products, powdered products, flavors, toppings, sauces, and/or flowable products either to blend one of the products or a combination of the products together for dispensing and/or injecting of the products. Automated temperature controlled liquid line and/or automated temperature controlled liquid reservoir tank may be located in the interior or the exterior of the machine, modular door, "I-Kit" component system, and/or mix chambers. Further, the automated temperature controlled liquid line and/or automated temperature controlled liquid reservoir tank can be used in cleaning and/or sanitation cycles and/or systems of the machine, modular door, and/or "I-Kit" component system through touch screen interface and mobile devices, wired or wirelessly. This system can also be used in conjunction with the flavor enhancement system.

Password protection is a security process that protects the information accessibility via touch screen interface and/or mobile device(s) that needs to be protected from certain users. Password protection allows only those with an authorized password to gain entry to access certain information, networks, and system(s) in order to authenticate the user(s).

Software for the automated portion controlled dispensing and/or injecting system of the machine, modular door, and/or "I-Kit" component are of a collection of computer programs, procedures, and/or documentation that are designed to perform many different and sometimes unique tasks in a computer system, touch screen interface and/or mobile devices. There are many different types of software which speak to the computer system, touch screen interface and/or mobile devices. Here is some of the different software used in the automated portion controlled dispensing and/or injecting system of the machine, modular door, and/or "I-kit" component: programming software, system software, application software, malware, adware, inventory management software, utility software, data back-up and recovery software, word processing software, data base software, spread sheet software, multi-media software, information worker software, educational software, simulated software, content access software, software that aids engineering and development of products, CAD program software, design software, presentation software, chemical program software, electrical program software, nutritional software, blending software, metering software, refrigeration software, dispensing and injecting software, HVAC software, mechanical software, and any and all software needed to perform the functions and/or the purpose of which the software is designed for the portion controlled dispensing and/or injecting system and/or modular portable portion controlled dispensing and/or injecting system. All software, programs, procedures, and/or documentation of the machine, modular door and/or "I-Kit" will have a written source code for computer, touch screen interface, and mobile devices. The source code of the programs will be specially designed to facilitate the work of the computer programmers who will specify the actions and functions and performance of the computers, touch screen interface, and mobile devices. The source code is in a secured system and has the ability to be transferred to any of the devices by a protected password. The source code will be distributed to the computer, touch screen interface and/or mobile devices in a form that includes executable files.

Figure 22:
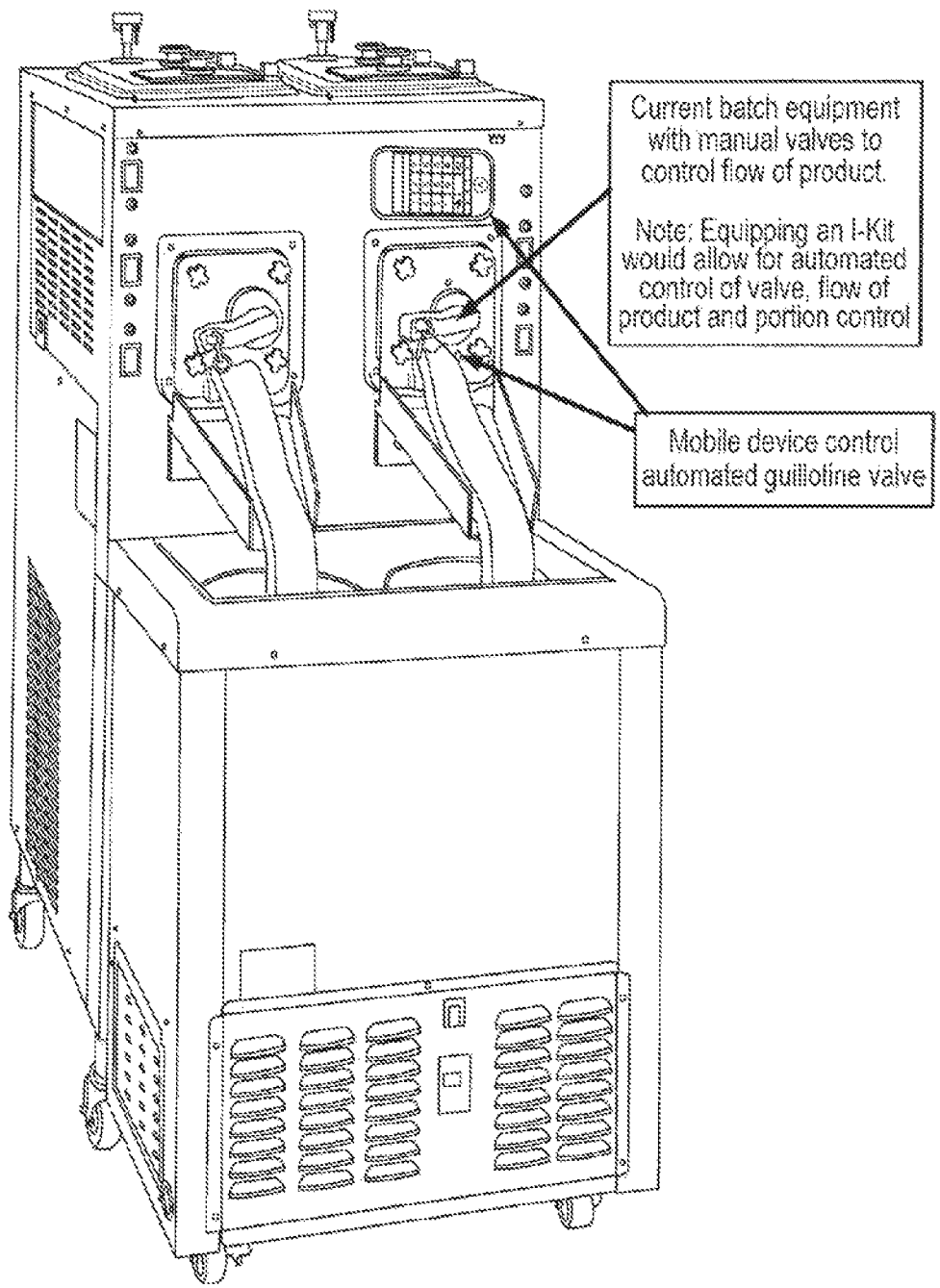
FIG. 22 illustrates an example of the modular design of the present disclosure.

An "I-Kit" component is a modular design comprised of interchangeable components. Some components can be disposable and/or single use. The modular design applies to the configuration of interchangeable components to allow for modular automated dispensing and/or injecting from a variety of machines. An example is shown in FIG. 22. The "I-Kit" component is comprised of an automated draw valve and/or automated draw valve plunger, an automated guillotine valve, automated nozzle adaptor and/or automated nozzle built into an attachable or detachable modular frame and an interface and/or mobile devices. The design of the valves is such that they are to control the flow of product(s) through any orifice(s) whereby enabling any machine automating the dispensing and/or injecting capabilities. In addition to the automated feature, portion control can be achieved by said automated valve in communication with an interface and/or device. An "I-Kit" component is independent of the machine and modular door, and can be applied to many injecting and/or dispensing systems either operating internally and/or externally of the apparatus. All components can function independently or collectively with each other. The "I-Kit" component and any part or components of the system can be molded as part of the interior or exterior walls, passageways and/or orifices of the apparatus and/or modular door. All components can function independently or collectively with each other. The "I-Kit" component and any part or component of the system can be molded as part of the interior or exterior walls, passageways and/or orifices of the apparatus All the components of the "I-Kit" component are automated, interchangeable, temperature controlled, have a metering system, a flavor enhancement system, a secured system, digital readouts, can accept payments (credit card or mobile devices), can be operated manually, can be made with various different types of material, be available in different sizes, shapes, styles and designs, and come equipped with O-Rings, seals, and gaskets. The automated nozzles, automated nozzle adaptors, automated draw valves, automated draw valve plungers and automated guillotine valves come in many different styles, shapes, sizes, lengths, widths and angels. All the "I-Kit" component components have different types of movements and have different settings, such as up, down, rotate, pause, stop, start, rotate, plunge, spiral, circular, left to right, right to left, with motorized components to blend for products such as shakes and smoothies. An "I-Kit" component system, one or all of the components work independently whether they are molded to the apparatus or on their own.

The automated multi orifices design, machine design, modular door design and/or "I-Kit" component design having more than one automated orifice(s) from a single holding and/or mix chamber, barrel, container, and machine. Wherein any automated orifice may be an automated draw valve, automated draw valve plunger, automated guillotine valve, automated nozzle adaptor, automated nozzle, the configuration of such components may be used in conjunction with each other and/or independent of each other, and/or none at all. Any automated multi orifice(s) could be used for portion control, dispensing and/or injecting, through the touch screen interface and/or mobile devices, either wired or wirelessly. Any automated multi orifices can automated interchangeable components. Any automated multi orifice can be temperature control, independently or collectively. Any automated multi orifice may be meted. Any automated multi orifice may be digital readings. Any automated multi orifice may be made of different material. Any automated multi orifice may come in different sizes, shapes and designs. Any automated multi orifice may be part of the cleaning system and/or dispensing and/or injecting system. Any automated multi orifice may be part of the flavor enhancement system. Any automated multi orifice may be part of the forced engineering system. Any automated multi orifice may be part of the temperature controlled liquid line. Any automated multi orifice may have a broad range of movements. Any automated multi orifice may have the drip proof system. Any automated multi orifice may have probe sensors and probe meters. Any automated multi orifice whereby may have various applications outside its intended use.

Figure 24:
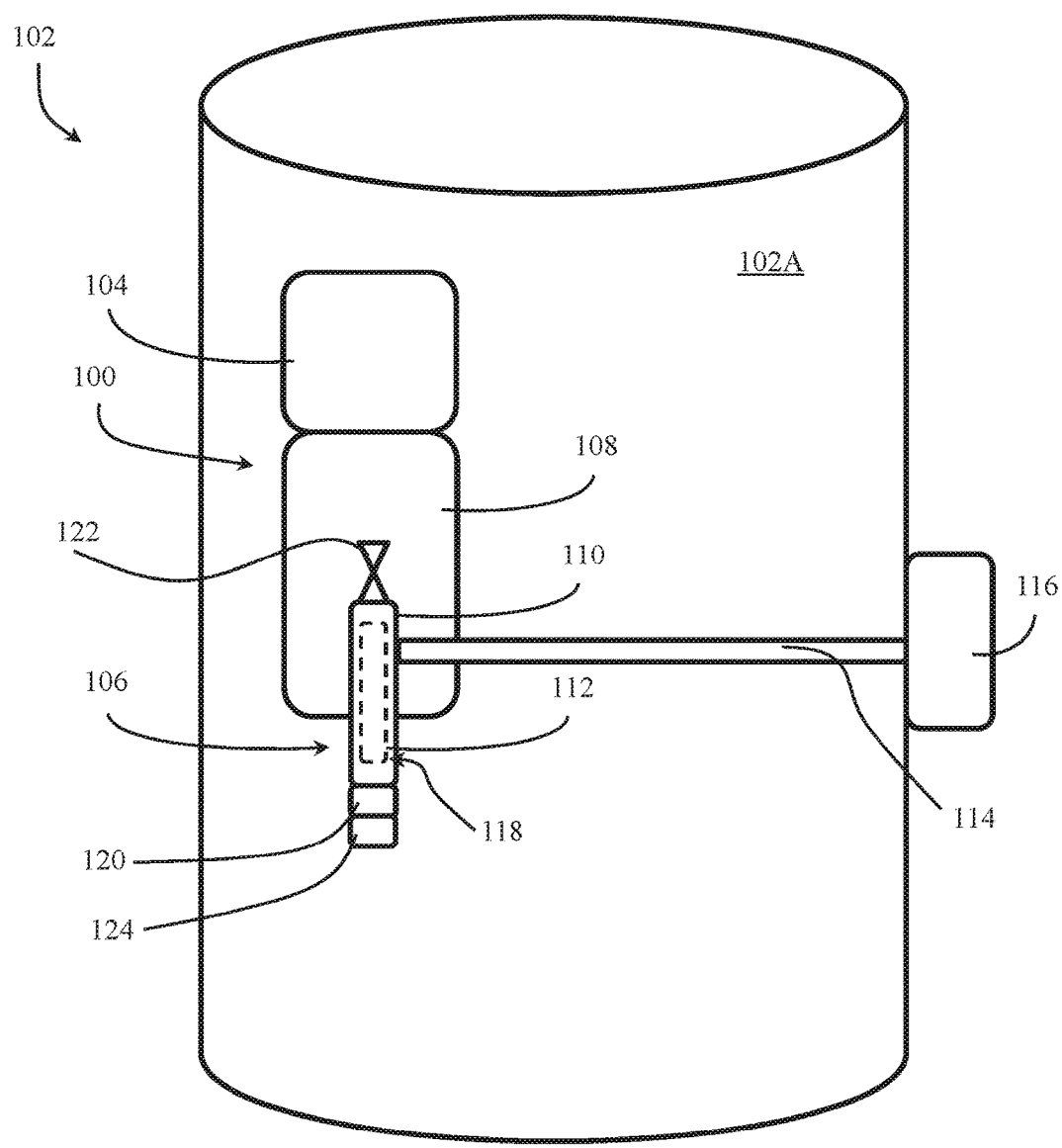
FIG. 24 illustrates a liquid beverage dispensing system in the form of a coffee dispensing system, in accordance with embodiments of the present invention.
Figure 25:
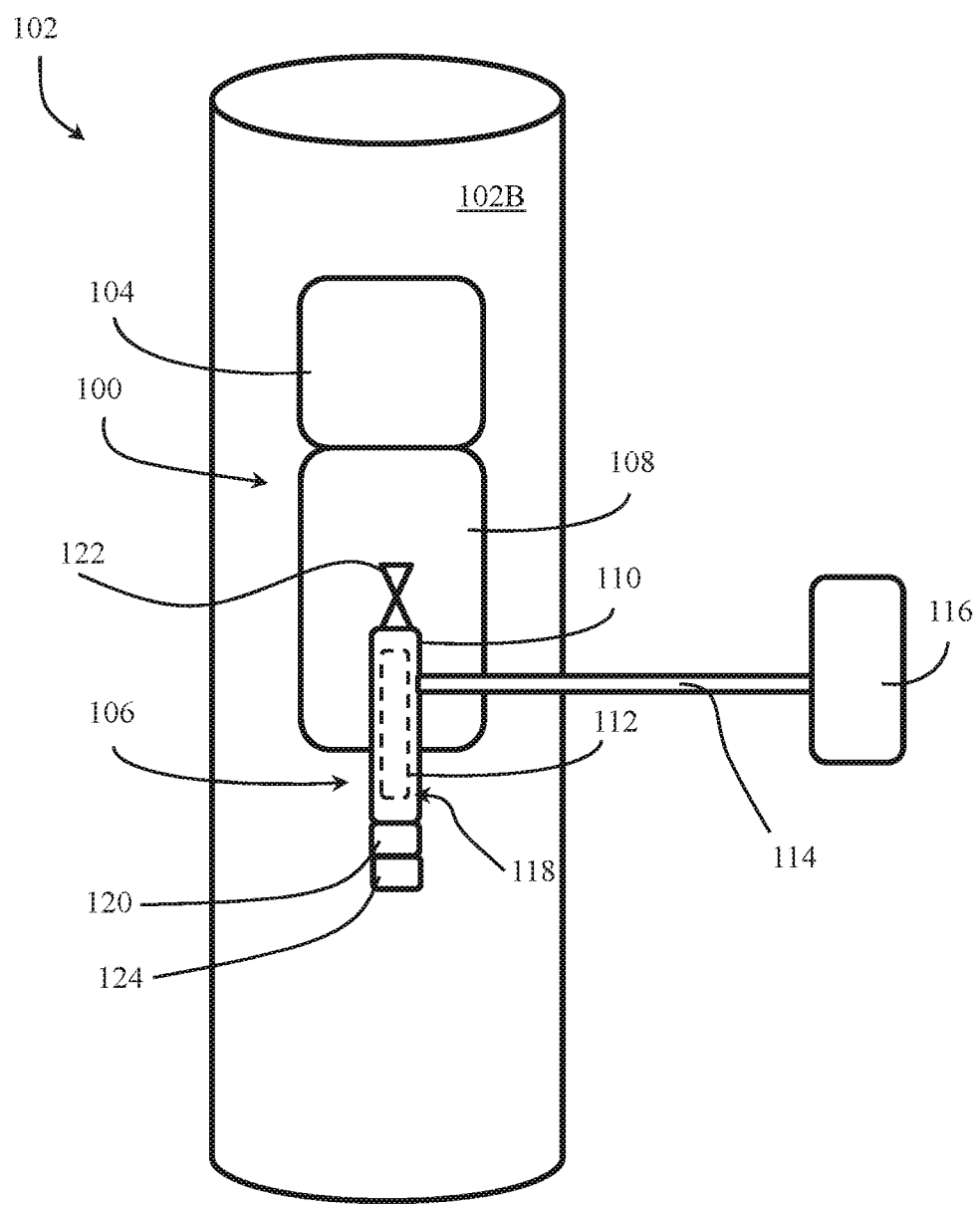
FIG. 25 illustrates a liquid beverage dispensing system in the form of a beer dispensing system, in accordance with embodiments of the present invention.
Figure 26:
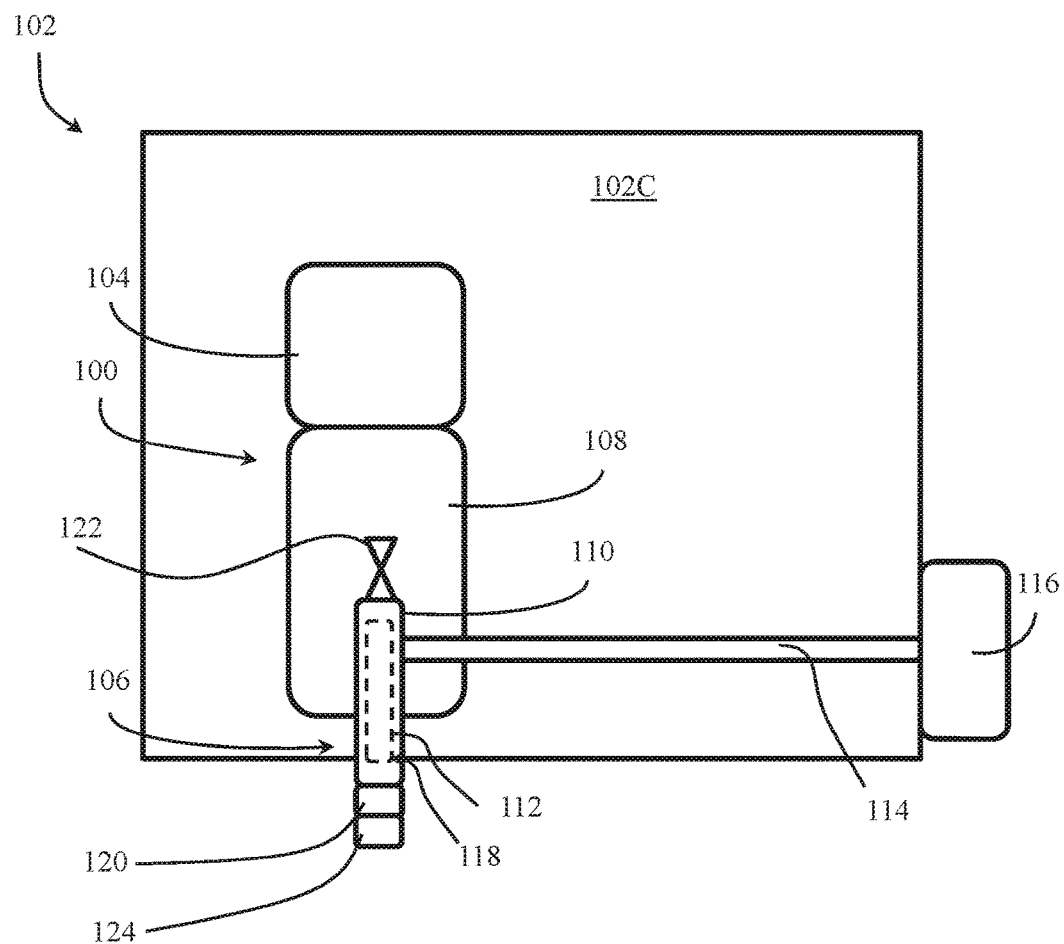
FIG. 26 illustrates a liquid beverage dispensing system in the form of a carbonated beverage dispensing system, in accordance with embodiments of the present invention.

In accordance with an example embodiment of the present invention, and as depicted in FIG. 24 through FIG. 26, a modular component 100 configured for use in a beverage dispensing system 102 is provided. The modular component 100 includes a communication interface and controller 104. A beverage faucet 106 is included. The beverage faucet comprises an actuator 108 and a valve 110 adapted to control flow of liquid beverage through the faucet 106, the valve 110 coupled with and controllable by the actuator 108 to open and close the valve 110. As discussed elsewhere herein, a nozzle can be provided at the exit point of the beverage faucet 106, which is a configuration anticipated by the present invention whether for frozen flowable edible product, or liquid beverage. The actuator 108 is in electronic communication with the communication interface and controller 104 and is responsive to direction received from the communication interface and controller 104 to open or close the valve. The modular component 100 is sized, dimensioned, and configured to be retrofitted to an existing beverage dispensing system 102 to replace an existing conventional manual beverage faucet. It should be noted that the embodiment depicted in FIGS. 24 through 26 is specifically configured for liquid beverage dispensing systems. Only those components specifically configured for liquid beverage (vs. frozen flowable edible product) are depicted. However, the inventor anticipates combinations of the modular component 100 for liquid beverage dispensing machine use to further incorporate all other components and elements described herein with respect to the frozen edible product system configurations described herein that would be understood by those of skill in the art to be combinable and operable with the embodiments shown in FIGS. 24 through 26. For purposes of efficiency, these elements and components (e.g., the I-Kit and other elements and components) will not be repeated here from earlier portions of this detailed description.

The modular component 100 can be configured to replace an existing conventional manual beverage faucet in the form of a coffee dispensing system as shown in FIG. 24 wherein the beverage dispensing system is a coffee dispensing system 102A. Likewise, the modular component 100 can be configured to replace an existing conventional manual beverage faucet in the form of a beer dispensing system 102B such as shown in FIG. 25. Further likewise, the modular component 100 can be configured to replace an existing conventional manual beverage faucet in the form of a carbonated beverage dispensing system 102C, as shown in FIG. 26.

The modular component 100 further includes a plunger 112 coupled with the actuator 108 and moveable within the valve 110 to effectuate opening and closing of the valve 110. The plunger 112 can be interchangeable.

The communication interface and controller 104 can be implemented in a number of difference ways, including using a wired internet connection, a wireless internet connection, a remote control device, and a touchscreen device.

An additive delivery system 114 can be utilized in conjunction with the modular component 100. The additive delivery system 114 can include at least one cartridge 116 for addition of one or more additives into the flow of liquid beverage through the faucet 106. The additive delivery system 114 can supply a flavor additive, such as any desired flavor (e.g., mocha, hazelnut, orange, pumpkin, or the like). Alternatively, or in addition, the additive delivery system 114 can supply a nutritional supplement, such as a vitamin supplement, an energy boosting herb supplement, or the like, as would be readily understood by those of skill in the art.

The plunger is disposed within a plunger pocket, which is disposed within the valve. The modular component 100 can further include a metering system 120 configured to quantify an amount of liquid beverage dispensed through the beverage faucet 106. The modular component 100 can further include a manual control 122 moveable to open and close the valve 110. The manual control 122 can be manual control is a draw handle. The modular component 100 can further include sensors 124 for sensing at least one of the characteristics of the group consisting of temperature, bacteria level, viscosity and type of product. The modular component 100 can be configured to receive payment from a credit card or mobile application, as would be understood by those of skill in the art. Likewise, the communication interface and controller 104 can generate advertising and promotional messages, and/or display nutritional information about the liquid beverage. The modular component 100 controls dispensing of the liquid beverage according with a desired nutritional parameter. The communication interface and controller 104 is operably connected to a communication network and enables two-way communication to and from the communication interface and controller.

The valve 110 can be of any known and suitable form of valve, including a ball valve, a gate valve, a butterfly valve, a needle valve, plunger valve, a metering valve, or a guillotine valve, as would be understood by those of skill in the art. The particular valve configuration would be correlated to the desired purposed of the liquid beverage dispenser. Specific configurations will be understood by those of skill in the art. For example, the guillotine valve may operate with or without the plunger and or/nozzle components. The guillotine door may operate within its own housing with the smart door system as a control valve, or the like, and may further control portion control dispensing.

The actuator 108 can be a motorized plunger assembly moveable within the valve 110 to effectuate opening and closing of the valve 110. The actuator 108 can have adjustable speeds and configurations.

It should be further noted that the modular component 100 can have all or a portion of the system components configured as being interchangeable, including liquid lines, tank systems, orifices, passageways, housings, nozzles, adaptors, temperature controlled heating and/or cooling tanks, drip proof systems, digital displays, power supplies, and the like. It should also be noted that the modular component 100 can operate independently from, or collaboratively with, the beverage dispensing system 102.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A modular component configured for use in a beverage dispensing system, comprising:
   a communication interface and controller;
   a beverage faucet, comprising:
     an actuator;
     a valve adapted to control flow of liquid beverage through the faucet, the valve coupled with and controllable by the actuator to open and close the valve;
   wherein the actuator is in electronic communication with the communication interface and controller and is responsive to direction received from the communication interface and controller to open or close the valve;

wherein the modular component is sized, dimensioned, and configured to be retrofitted to an existing beverage dispensing system to replace an existing conventional manual beverage faucet.

2. The modular component of claim 1, wherein the beverage dispensing system is a coffee dispensing system.

3. The modular component of claim 1, wherein the beverage dispensing system is a beer dispensing system.

4. The modular component of claim 1, wherein the beverage dispensing system is a carbonated beverage dispensing system.

5. The modular component of claim 1, further comprising a plunger or a guillotine coupled with the actuator and moveable within the valve to effectuate opening and closing of the valve.

6. The modular component of claim 5, wherein the plunger is interchangeable.

7. The modular component of claim 5, wherein the plunger is disposed within a plunger pocket, which is disposed within the valve.

8. The modular component of claim 1, wherein the communication interface and controller is chosen from the group consisting of a wired internet connection, a wireless internet connection, a remote control device, and a touchscreen device.

9. The modular component of claim 1, further comprising an additive delivery system including at least one cartridge for addition of one or more additives into the flow of liquid beverage through the faucet.

10. The modular component of claim 9, wherein the additive delivery system supplies a flavor additive.

11. The modular component of claim 9, wherein the additive delivery system supplies a nutritional supplement.

12. The modular component of claim 1, further comprising a metering system configured to quantify an amount of liquid beverage dispensed through the beverage faucet.

13. The modular component of claim 1, further including a manual control moveable to open and close the valve.

14. The modular component of claim 13, wherein the manual control is a draw handle.

15. The modular component of claim 1, further comprising sensors for sensing at least one of the characteristics of the group consisting of temperature, bacteria level, viscosity and type of liquid beverage.

16. The modular component of claim 1, wherein the component is configured to receive payment from a credit card or mobile application.

17. The modular component of claim 1, wherein the communication interface communication interface and controller can generate advertising and promotional messages.

18. The modular component of claim 1, wherein the communication interface communication interface and controller displays nutritional information about the liquid beverage.

19. The modular component of claim 1, wherein the modular component controls dispensing of the liquid beverage according with a desired nutritional parameter.

20. The modular component of claim 1, wherein the communication interface and controller is operably connected to a communication network and enables two-way communication to and from the communication interface and controller.

21. The modular component of claim 1, wherein the valve comprises a guillotine valve.

22. The modular component of claim 1, wherein the valve comprises a metering valve.

23. The modular component of claim 1, wherein the actuator comprises a motorized plunger assembly moveable within the valve to effectuate opening and closing of the valve.

* * * * *